United States Patent
Wetsch

(10) Patent No.: US 11,077,637 B2
(45) Date of Patent: Aug. 3, 2021

(54) CONNECTIVE PROTECTIVE PACKAGING

(71) Applicant: Pregis Innovative Packaging LLC, Deerfield, IL (US)

(72) Inventor: Thomas D. Wetsch, St. Charles, IL (US)

(73) Assignee: Pregis Innovative Packaging LLC, Deerfield, IL (US)

( * ) Notice: Subject to any disclaimer, the term of this patent is extended or adjusted under 35 U.S.C. 154(b) by 0 days.

(21) Appl. No.: 15/721,215

(22) Filed: Sep. 29, 2017

(65) Prior Publication Data

US 2018/0093441 A1 Apr. 5, 2018

Related U.S. Application Data

(60) Provisional application No. 62/402,378, filed on Sep. 30, 2016.

(51) Int. Cl.
*B31D 5/00* (2017.01)
*B29C 65/00* (2006.01)
(Continued)

(52) U.S. Cl.
CPC .......... *B31D 5/0069* (2013.01); *B29C 66/439* (2013.01); *B29C 66/71* (2013.01);
(Continued)

(58) Field of Classification Search
CPC ... B29D 22/02; A61J 1/10; B32B 1/08; B29C 66/71; B29C 66/439; B31D 5/0069;
(Continued)

(56) References Cited

U.S. PATENT DOCUMENTS 3,616,114 A 10/1971 Hamaguchi
3,650,877 A 3/1972 Johnson
(Continued)

FOREIGN PATENT DOCUMENTS

EP 0128127 A2 12/1984
JP H07165266 A 6/1995
(Continued)

OTHER PUBLICATIONS

Sealed Air, "InstaPak Foam Packaging", 2013, Sealed Air, obtained from url http://www.sealedairprotects.com/eu/en/products/foam_packaging/foam-in-place.aspx.*
(Continued)

*Primary Examiner* — Chun Hoi Cheung
*Assistant Examiner* — Brijesh V. Patel
(74) *Attorney, Agent, or Firm* — Fox Rothschild LLP

(57) ABSTRACT

A connective protective packaging element is provided. The connective protective packaging element may include a protective body in a high-density supply configuration. The protective body may be configurable into a low-density configuration for cushioning packaged products. The body may include an exposed surface in the low-density configuration. The connective protective packaging element may also include a bonding element attached to the exposed surface that operably bonds the exposed surface to an abutting surface by contact with the bonding element.

26 Claims, 14 Drawing Sheets

(51) Int. Cl.
*B65D 81/05* (2006.01)
*B29K 275/00* (2006.01)

(52) U.S. Cl.
CPC ......... *B31D 5/0073* (2013.01); *B65D 81/052* (2013.01); *B29K 2275/00* (2013.01); *B31D 2205/007* (2013.01); *B31D 2205/0047* (2013.01); *B31D 2205/0064* (2013.01); *B31D 2205/0088* (2013.01)

(58) Field of Classification Search
CPC ............ B31D 5/0073; B31D 2205/007; B31D 2205/0088; B31D 2205/0064; B31D 2205/0047; B29K 2275/00; B65D 81/052
USPC ............ 428/35.2, 355 R; 206/390, 554, 594; 383/211, 32, 84–85; 427/207.1, 208.4; 53/461, 465
See application file for complete search history.

(56) References Cited

U.S. PATENT DOCUMENTS

| | | | |
|---|---|---|---|
| 3,655,500 A | 4/1972 | Johnson | |
| 3,735,918 A * | 5/1973 | Tundermann | B65D 33/18 383/32 |
| 3,885,070 A | 5/1975 | Chapman | |
| 4,222,533 A | 9/1980 | Pongracz | |
| 4,379,012 A | 4/1983 | Heymanns | |
| 4,720,320 A | 1/1988 | Niemi | |
| 4,770,913 A | 9/1988 | Yamamoto | |
| 4,911,563 A | 3/1990 | Ciani | |
| 5,123,889 A | 6/1992 | Armington | |
| 5,212,002 A | 5/1993 | Madrzak | |
| 5,261,466 A | 11/1993 | Koyanagi | |
| 5,322,230 A | 6/1994 | Dylla | |
| 5,323,981 A | 6/1994 | Dionne | |
| 5,387,173 A | 2/1995 | Simmons | |
| 5,454,642 A * | 10/1995 | De Luca | B65D 81/052 206/522 |
| 5,826,723 A * | 10/1998 | Jaszai | B65D 81/03 206/522 |
| 5,855,714 A | 1/1999 | Bockh | |
| 5,899,406 A | 5/1999 | Payne | |
| 5,996,927 A | 12/1999 | Weirauch | |
| 6,151,869 A * | 11/2000 | Weder | A01G 5/04 53/219 |
| 6,156,424 A * | 12/2000 | Taylor | A61L 15/585 427/207.1 |
| 6,179,765 B1 | 1/2001 | Toth | |
| 6,244,321 B1 | 6/2001 | Sakamoto | |
| 6,402,674 B1 | 6/2002 | Simmons | |
| 6,451,145 B1 | 9/2002 | Forbes | |
| 6,789,376 B1 | 9/2004 | Greenwood et al. | |
| 6,951,676 B2 | 10/2005 | Shaw | |
| 7,585,268 B2 | 9/2009 | Cheich | |
| 8,016,735 B2 | 9/2011 | Wetsch et al. | |
| 8,061,110 B2 * | 11/2011 | Wetsch | B31D 5/0073 53/403 |
| 8,388,508 B2 | 3/2013 | Wetsch et al. | |
| 8,424,552 B2 | 4/2013 | Wetsch et al. | |
| 8,545,779 B2 | 10/2013 | Blint | |
| 8,962,909 B2 | 2/2015 | Groosman et al. | |
| 9,138,921 B2 | 9/2015 | Cocciadiferro | |
| 2002/0064319 A1 | 5/2002 | Tanaka et al. | |
| 2002/0092272 A1 * | 7/2002 | Sperry | B29C 44/182 53/455 |
| 2002/0094395 A1 * | 7/2002 | Weder | B31D 5/0073 53/403 |
| 2002/0108351 A1 | 8/2002 | Sperry et al. | |
| 2002/0108352 A1 | 8/2002 | Sperry et al. | |
| 2003/0108699 A1 * | 6/2003 | Tanaka | B65D 81/052 428/35.2 |
| 2004/0163991 A1 | 8/2004 | Koyanagi et al. | |
| 2005/0031233 A1 * | 2/2005 | Varanese | B65D 33/20 383/211 |
| 2005/0109656 A1 | 5/2005 | Ishizaki | |
| 2006/0191815 A1 | 8/2006 | Nishi et al. | |
| 2007/0202284 A1 * | 8/2007 | True | B32B 7/12 428/35.2 |
| 2008/0210591 A1 * | 9/2008 | Cheich | B65D 5/5028 206/594 |
| 2010/0029456 A1 | 2/2010 | Cheich | |
| 2010/0096290 A1 | 4/2010 | Frayne et al. | |
| 2011/0061986 A1 * | 3/2011 | Orsini | B31D 5/0043 192/133 |
| 2013/0047551 A1 | 2/2013 | Jones | |
| 2014/0314978 A1 * | 10/2014 | Lepine | B29D 22/02 428/35.2 |
| 2015/0291335 A1 * | 10/2015 | Wetsch | B65D 81/052 428/12 |
| 2015/0291336 A1 | 10/2015 | Wetsch | |

FOREIGN PATENT DOCUMENTS

| | | |
|---|---|---|
| JP | 11-286357 | 10/1999 |
| JP | 2001240138 A | 9/2001 |
| JP | 2007525579 A | 9/2007 |
| JP | 2014181049 A | 9/2014 |
| JP | 2016525473 A | 8/2016 |
| WO | 9425380 A1 | 11/1994 |
| WO | 2012088521 A2 | 6/2012 |

OTHER PUBLICATIONS

Sealed Air, "InstaPak Foam-In-Bag Packaging", 2013, Sealed Air, obtained form url http://www.sealedairprotects.com/eu/en/products/foam_packaging/foam-in-bag.aspx.*
International Search Report and Written Opinion dated Dec. 26, 2017, in PCT Application No. PCT/US2017/05443, 8 pages.
European Patent Application No. 17857536.1 Extended European Search Report dated Mar. 18, 2020.

* cited by examiner

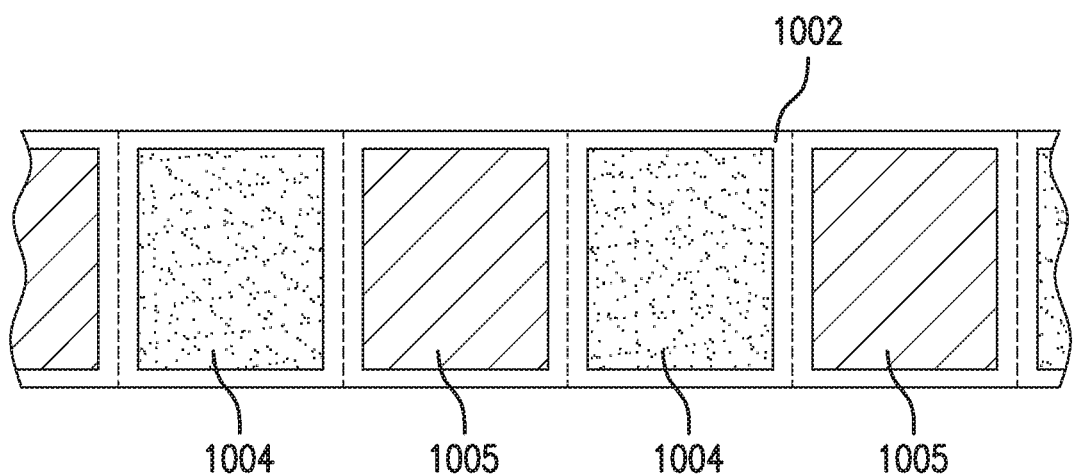
FIG.9
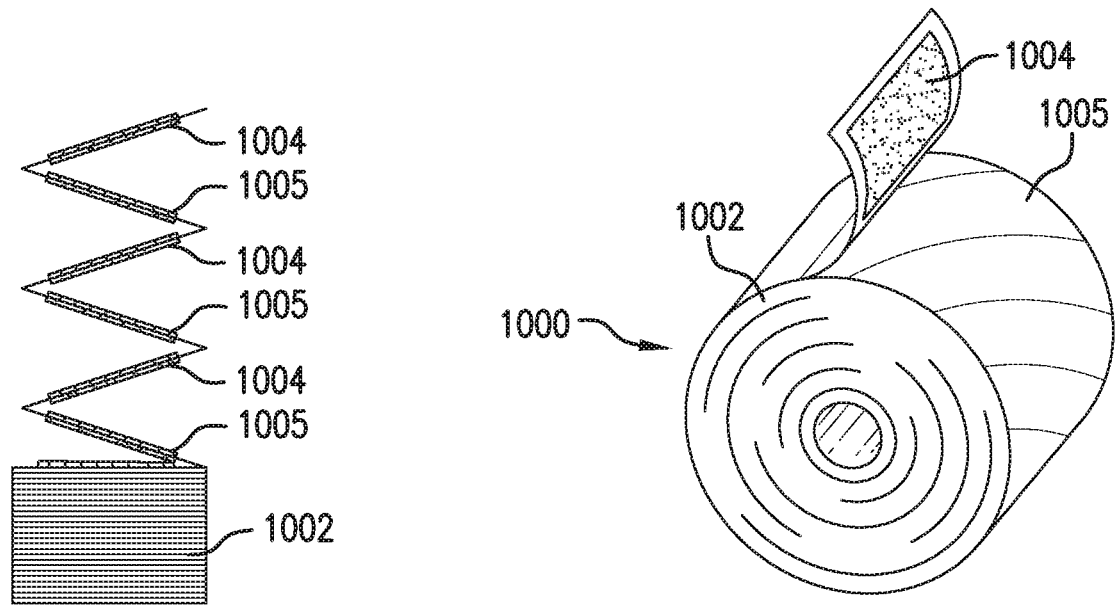
FIG.10
FIG.11

CONNECTIVE PROTECTIVE PACKAGING

CROSS REFERENCE TO RELATED APPLICATION

This patent application claims priority to U.S. Provisional Patent Application No. 62/402,378, filed on Sep. 30, 2016, the contents of which are incorporated herein in its entirety.

TECHNICAL FIELD

The present disclosure relates to inflatable flexible structures.

BACKGROUND

Protective packaging elements, such as paper or other dunnage, or inflatable protective packaging, such as fluid (e.g., air) inflatable packaging or foam-in-bag protective packaging, are used to provide added protection to objects during packaging. The protective packaging elements are typically configured to surround an object that is to be protected. Typically, a product is packaged with protective packaging inserted next to the product in the container. In transit, the contents of the container often move and reposition themselves such that the protective packaging does not effectively protect the product from damage. In order to avoid this inadequacy, packagers in some cases will wrap the protective packaging around the product and then apply adhesive tape to the protective packaging. The application of the tape, however, can be cumbersome, especially when packaging numerous products.

SUMMARY

In accordance with various embodiments, a connective protective packaging element is provided. The connective protective packaging element may include a protective body in a high-density supply configuration. The protective body may be configurable into a low-density configuration for cushioning packaged products. The body may include an exposed surface in the low-density configuration. The connective protective packaging element may also include a bonding element attached to the exposed surface that operably bonds the exposed surface to an abutting surface by contact with the bonding element.

In accordance with various embodiments, the bonding element may be a sticking element that operably sticks to and holds the exposed surface to the abutting surface by contact with the sticking element. The protective body may include a web having first and second overlapping plies that are connected together to define therebetween a fillable chamber to contain a filler element that separates the wall plies in the low-density configuration. The first ply may include the exposed surface with the sticking element. The film plies are connected together to trap a fluid therebetween when sealed, such that the protective packaging element is an inflatable cushion. The fluid may be air. The film plies may be connected together by an airtight seal. The abutting surface is another part of the exposed surface, the sticking element being disposed on the exposed surface to contact the abutting surface when the web is folded over itself. The protective packaging element may be a foam-in-bag cushion. Alternatively, the protective packaging element may be paper dunnage.

In accordance with various embodiments, the abutting surface may be another part of the exposed surface. The sticking element may be disposed on the exposed surface to contact the abutting surface when the packaging element is folded over itself. The sticking element may be disposed on the exposed surface for sticking to an abutting surface of a product that is packaged there against. The sticking element may be disposed on the exposed surface for sticking to an abutting interior surface of a container in which the protective packaging element is received to retain the connective protective packaging element in a position against the container while a product to be protected is being packaged. The sticking element may be adhesive that sticks to other surfaces. The sticking element may be a cohesive. The one or more surface includes a surface proximate an edge of the connective protective packaging element. \

In accordance with various embodiments, a web supply of web material is provided. The web supply of web material may include a first film ply having first and second longitudinal edges. The web supply of web material may include a second film ply having first and second longitudinal edges. The second film ply may be aligned to be overlapping with the first film ply so that the first respective first longitudinal edges are aligned with each other and the second respective longitudinal edges are aligned with each other. The web supply of web material may also include a plurality of seals sealing the first and second plies to each other to define one or more inflation chamber between the first and second plies that are each inflatable with and configured to contain a fluid. Separation regions may be located between adjacent inflation chambers to allow separation of the plies and provide a plurality of cushions. The plurality of seals are disposed in a repeating seal pattern to form cushions having a similar shape. A plurality of bonding elements may be disposed on an exposed surface of the first film ply. The plurality of bonding elements may be disposed in a repeating pattern so that each of the cushions has at least one bonding element. Each bonding element may be a sticking element that operably sticks to and holds the exposed surface to the abutting surface by contact with the sticking element.

BRIEF DESCRIPTION OF THE FIGURES

FIGS. 9-11 each show a supply of film material having a sticking element for supplying through an inflation machine.

DETAILED DESCRIPTION

Figure 1:
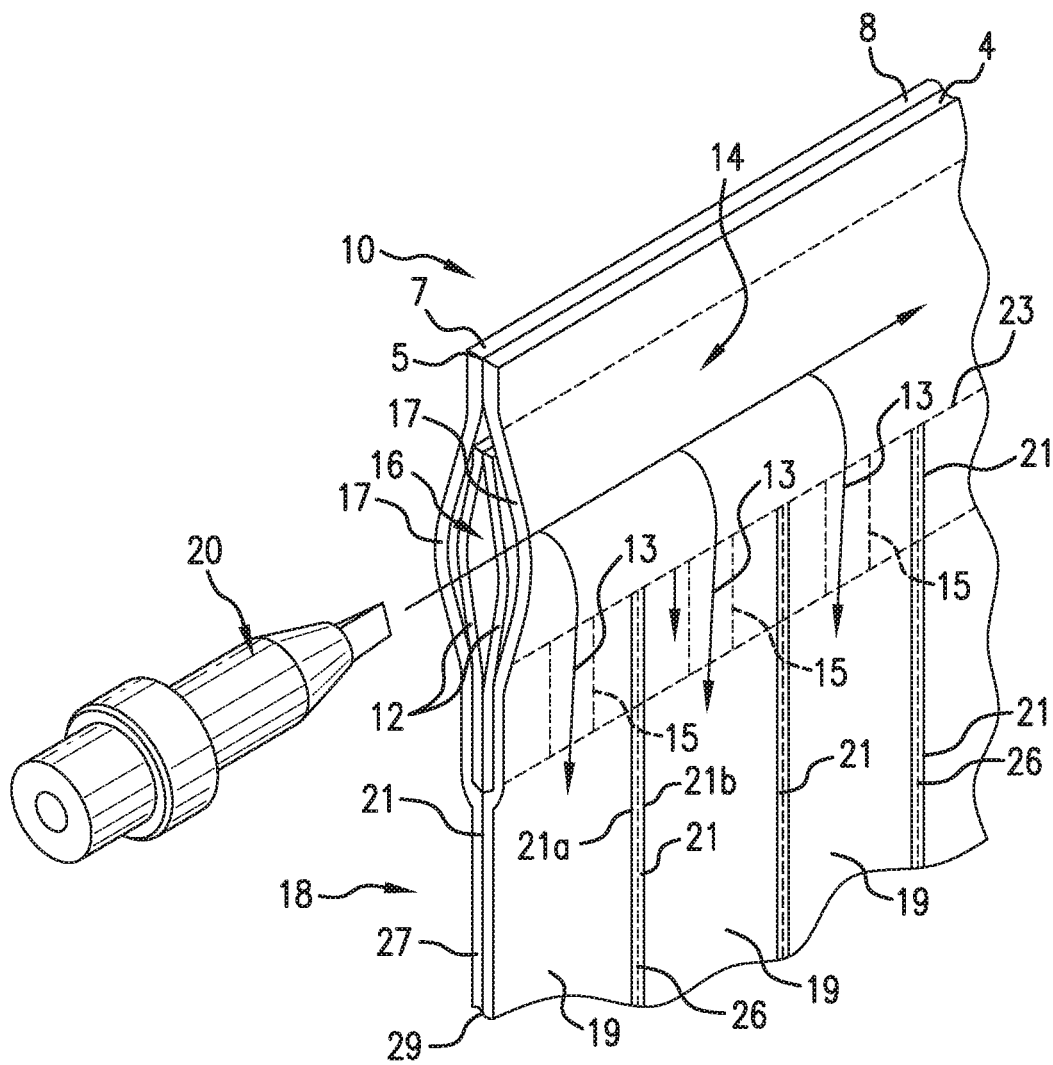
FIGS. 1-3 show flexible structures that when inflated define fluid filled cushions.

Disclosed is connective protective packaging having an exposed surface that includes a bonding element. The connective protective packaging has a protective body. The body can be provided in a high-density supply configuration that is reconfigurable into a low-density configuration for cushioning packaged products. In the low-density configuration, the protective body includes an exposed surface with a bonding element attached to it. The bonding element operably bonds the exposed surface to an abutting surface by contact with the bonding element to connect these surfaces. In some embodiments described below, the bonding element is a sticking element that operably sticks to and holds the exposed surface to the abutting surface by contact with the sticking element.

The connective protective packaging has portions that can connect to itself, to other protective packaging, or to other objects. As described below, the sticking element can have a sufficient degree of stickiness to hold the exposed surface to one or more other surfaces. The one or more other surfaces can be another surface of the protective packaging itself; a surface of another piece of protective packaging; a surface of a product being packaged; and/or a surface of a container. Thus, the sticking element can help maintain the configuration and position of the connective protective packaging to further improve its ability to protect products during shipping, handling, or similar conditions. The exposed surface can be an exterior surface of the protective packaging element, or another surface that is exposed in that it comes into contact with another surface which with it will be stuck (e.g., by folding onto the other surface to stick therewith).

In accordance with various embodiments, the connective protective packaging can include traditional types of packaging, such as paper or other dunnage, or inflatable protective packaging, such as fluid (e.g., air) inflatable packaging or foam-in-bag protective packaging, examples of which are described below. In preferred embodiments, the packaging is flexible. By applying the sticking element to the outside of the connective protective packaging and folding the connective protective packaging over on itself, a pocket is formed in which the product is placed. In some embodiments another portion of the connective protective packaging can then be fold over the product or the formed pocket to further secure the object therein.

Various type of cushions that form the connective protective packaging are disclosed below, but other suitable types of cushions may be used as well consistent with the disclosure herein.

Fluid Filled Cushions

In accordance with various embodiments, the connective protective packaging can include protective flexible packaging. One example of protective flexible packaging is a fluid filled cushion. In various examples of fluid filled cushions, the fluid filled cushion (e.g., air cushion) is made by sealing plies of plastic to form a series of flexible, plastic, inflation chambers that can be connected and adjoined in parallel to or in series with each other. An inflation channel can direct air to the tubular portions. This may be done continuously or discreetly. In some examples all of the separate tubular portions may be connected together in other examples the tubular portions may be separate and accessible (e.g., via one-way check-valves, an inflation region, etc.) to inflate the inflation chambers and maintain them in an inflated state. Once inflated, one or more air cushions are configured to surround and cushion a product that is to be protected. An example of such an air cushion is the AIR-SPEED® CHAMBERPAK™ by Pregis Corporation. Descriptions of other examples of inflatable air cushions can be found in, for example, U.S. Pat. No. 5,261,466, and U.S. Application Publication Nos. 2003/0108699, 2004/0163991, and 2005/0109656.

Figure 2:
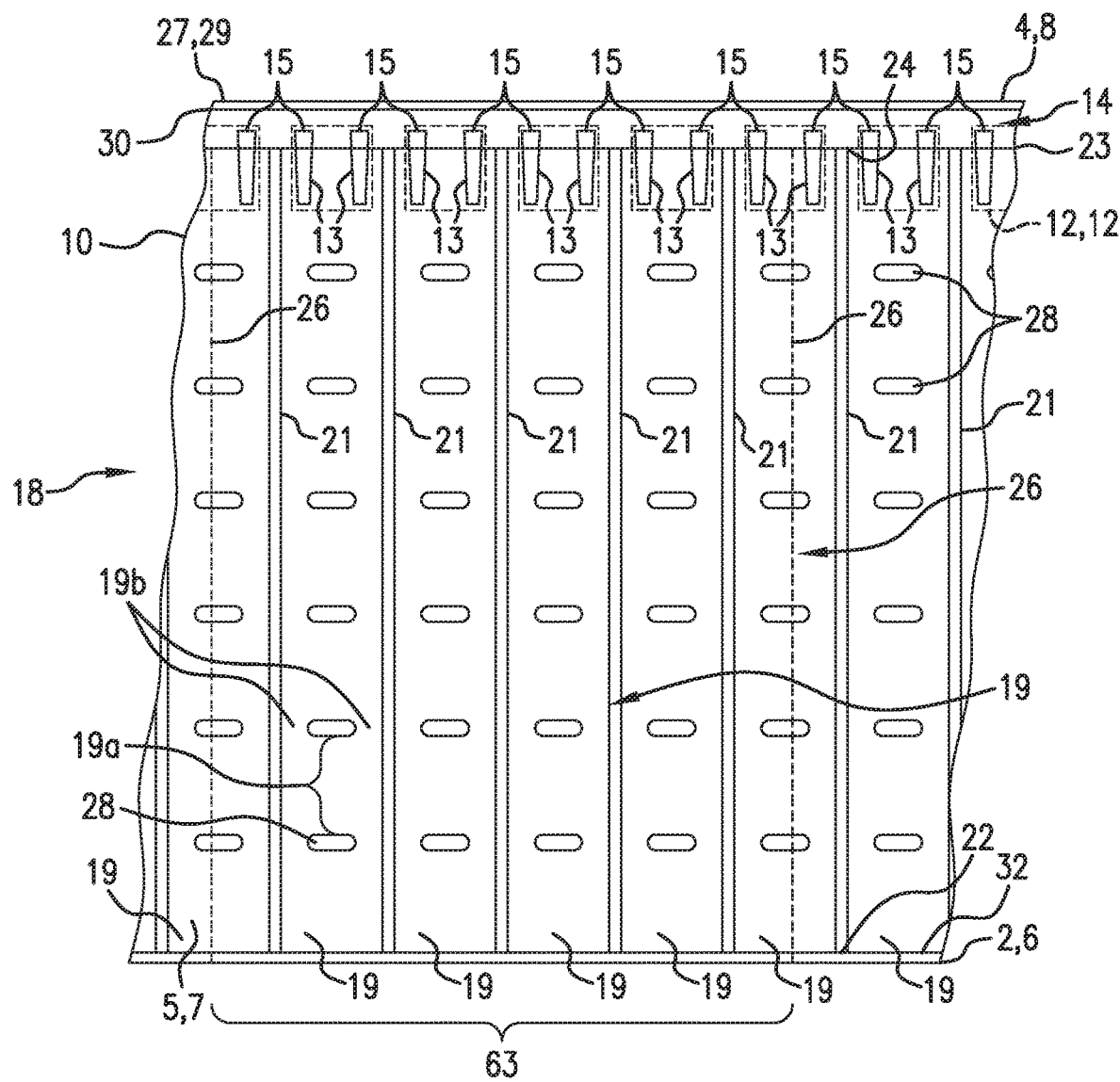
Figure 3:
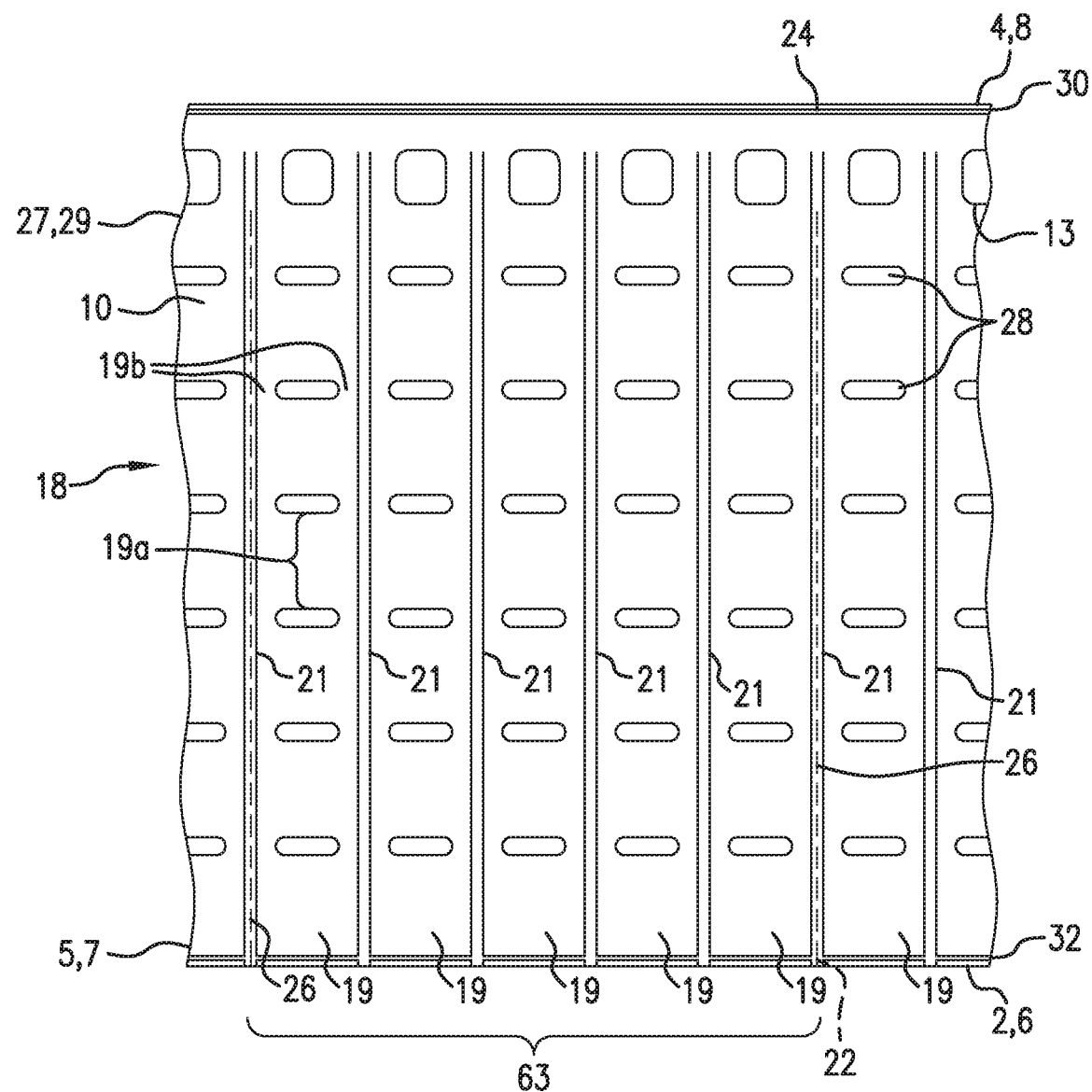

As shown in FIGS. 1-3, and in accordance with various embodiments, the connective protective packaging includes a flexible structure that when inflated defines the fluid filled cushions 18. FIGS. 1-3 show protective packaging that can have one or more sticking element as described herein. For example, any suitable embodiment of the described sticking element can be applied to the protective packaging of FIGS. 1-3. For example, the protective packaging shown in FIGS. 1-3 can have a sticking element covering substantially all of one or more exposed surfaces of the flexible structure (e.g., as shown in FIG. 6); alternatively, the protective packaging shown in FIGS. 1-3 can have a various exemplary patterns of one or more sticking elements disposed on a web of film that includes film plies. These patterns can be repeating (e.g., as disclosed herein with reference to FIGS. 8A-8L) or other suitable patterns. In various embodiments, the fluid filled cushion 18 may be made up of the film 10, with the film 10 being made up of plies 27, 29 comprising one or more layers of material. The plies 27, 29 may form walls 17 of the air cushion 18. Multiple walls 17 may form the air cushion 18. The air cushion 18 may include two or more walls 17. One wall 17 may be an outer first wall 5 having a first longitudinal edge 2 (see FIGS. 3-6) and a second longitudinal edge 4. A second wall 17 may be a second outer wall 7 having a first longitudinal edge 6 (see FIGS. 2-3) and a second longitudinal edge 8. The second outer wall 7 may be aligned to be overlapping and can be generally coextensive with the first outer wall 5, i.e., at least respective first longitudinal edges 2, 6 are aligned with each other and/or second longitudinal edges 4, 8 are aligned with each other.

The first and second walls 5, 7 can be formed from the first and second plies 27, 29. The first and second walls 5, 7 can be formed from a single sheet of material, a flattened tube of film material with one or more edges slit, or two sheets of film material. For example, the first and second walls 5, 7 can include a single sheet of film material that is folded to define the joined second edges 4, 8 (e.g., "c-fold film"). The c-folding film material 10 can form the first and second plies 27, 29. Alternatively, for example, the first and second walls 5, 7 can include a tube of film material (e.g., a flattened tube) that is slit along the aligned first longitudinal edges 2, 6 and/or the second longitudinal edges 4, 8. The flattened tube can form the first and second plies 27, 29. Also, for example, the first and second walls 5, 7 can include two independent sheets of film material joined, sealed, or otherwise attached together along the aligned second edges 4, 8. The two independent sheets of film material can be the first and second plies 27, 29.

The plies 27, 29 may in some embodiments include a separation region, for example, system of perforations forming a region of weakness 26 extending transversely across the ply 27, 29, or in other desired directions. This type of perforation may allow the sheet to be separated into individual pads or sheets with a single continuous inflation process. In some embodiments, the regions of weakness extend completely across the plies or sufficiently across the plies to facilitate complete separation of portions of the web.

For protective packaging applications, the disclosed film 10 can be converted by sealing two plies 27, 29 (multilayer or mono-layer) to each other to provide the supply material of inflatable cushions that can be inflated to provide inflated cushion protective packaging. In some embodiments, the plies 27, 29 are two sheets of a ply 27, 29. The plies 27, 29 may be heat sealed in a predetermined pattern and then may be inflated with a fluid, such as air. The plies 27, 29 can be sealed together to form the described structures with a process such as adhesively bonding, friction, welding, fusion, heat sealing, laser sealing, and ultrasonic welding.

The converted film 10 can be configured for use in a continuous inflation and sealing device, as disclosed in the '658 application or U.S. Pat. Nos. 8,454,779 and 8,061,110, for instance. Devices can be employed that convert, inflate, and seal the plies in-situ, such as disclosed in U.S. Pat. No. 6,789,376. Alternatively, the film 10 can be provided with check valves between the plies 27, 29 to seal the fluid in one or more inflated chambers, for example as disclosed in U.S. Patent Application Publication No. 2004/0163991, for inflating a single cushion at a time or for inflating on a continuous inflation machine that does not employ a heat sealer. In other embodiments, the film 10 can be used in a device for inflating the film 10 with foam precursors and sealing the film 10 for foam-in-bag protective packaging, such as disclosed U.S. Pat. No. 9,138,921.

As used herein, the film 10 may be comprised of the plies 27, 29 in any combination of layers, materials, and/or manufacturing processes discussed above. For example, film 10 may comprise at least one bi-directionally oriented film ply 27, 29 made up of a barrier layer positioned and connected to two sealing layers according to the disclosure above. In another example, film 10 may comprise a traditional film ply 27, 29 having a single layer with the grain in the longitudinal direction. The film plies 27, 29 may form walls 17, which may be formed of any of the materials, compositions or structures discussed above.

Referring again to FIG. 1, the film plies 27, 29 can include a series of transverse seals 21 disposed along the longitudinal extent of the film plies 27, 29. The seals 21 may be defined by portions of the walls 17 that have been attached to one another through such processes such as heat sealing. The walls 17 may be sealed together in predetermined areas to define an inflation channel 14, which may be flexible and normally in a collapsed state, and inflatable tubular portions 19. For example, transverse seals 21 may define the one or more inflatable chambers 19. Each transverse seal area 21 may extend from the longitudinal edge 2, 6 towards the opposite longitudinal edges 4, 8. Each transverse seal area 21 may include a pair of seals separated by an unsealed portion of the walls. In various examples, the longitudinal seal 23 may define the inflation channel 14. The opposite side of the inflation channel 14 may be defined by a longitudinal seal 30 applied to longitudinal edges 4, 8 and/or a seal applied adjacent thereto. In accordance with various embodiments, the transverse seals 21 may terminate at the longitudinal seals 23. As such, the transverse length of each of the tubular portions 19 may extend from the longitudinal seal 23 to a longitudinal seal 32 applied to longitudinal edges 2, 6 and/or a seal applied adjacent thereto.

Each transverse seal area 21 may have a first end 22 proximate the second longitudinal edge 2, 6 and a second end 24 proximate the longitudinal seal 23. Each transverse seal area 21 may be substantially straight, bent, or otherwise curved, and extend substantially perpendicular to the longitudinal edges 2, 6. The one or more chamber 19 may be defined within a boundary formed by the longitudinal seal 23 and pairs of adjacent transverse seals 21. The width of each inflation chamber 19 may be at least about ½ inches to about 3 inches. Or in another example, about 1 inches to about 2 inches.

The inflatable cushion 18 may include an inflation region, which is a zone in fluid connection with the inflatable chambers to feed the fluid from an inflation nozzle into the chambers. In some embodiments, the inflation region can be provided by one or more flaps and be open laterally to the exterior of the cushion. For example, two opposing flaps can be used, providing an inflation region that is open along its length, such as on a transverse side thereof. These open inflation regions can be used in inflation and sealing machines, for instance, that pinch the flaps about a nozzle and sealer.

In other embodiments, the inflation region is a passageway that is closed on its transverse sides to provide an inflation channel 14. The longitudinal inflation channel 14, as shown in FIG. 1, may be continuous or may be closed at a longitudinal end thereof. The channel 14 may be disposed between the second end 24 of the transverse seals 21 and the longitudinal edge 4, 8 or the longitudinal seal 30. The longitudinal inflation channel 14 can extend longitudinally along the longitudinal length of the cushion 18 proximate edges 4, 8.

The cushion 18 also includes an inflation opening or entrance 16. The inflation entrance 16 is disposed on at least one end of the longitudinal inflation channel 14. The entrance 16 is defined by the walls 17 (e.g., outer walls 5, 7) and is configured and dimensioned for receiving an inflation nozzle (e.g., nozzle 20) therein. The inflation nozzle may be any nozzle such as, for example, the one discussed in U.S. Pat. No. 8,424,552.

Referring to FIGS. 1 and 2, located partially within the entrance 16 and inflation channel 14, and extending partially into each of the tubular portions 19, is another set of sheets 12. Sheet 12 may also be sealed along transverse and longitudinal seals 21 and 23, except at valve areas 15. Valve areas 15 may define one-way check valves 13 between the areas 15, configured to let air into the tubular portions 19 from inflation channel 14 and seal the air therein. The unsealed areas between sheets 12 that define the check-valves 13 may be kept unsealed during the sealing operation that seals inner sheets 12 to outer sheets 17 by printing on the areas to remain unsealed.

Each of the one-way check valves 13 fluidly connects the inflation channel 14 to a respective tubular portion 19. In the uninflated state, for example during shipping of the cushions 18, the entrance 16 is closed and flat, and the check-valves 13 are in a closed position. Upon opening of the aperture 16 by the inflation nozzle 20, air can be delivered into the inflation channel 14. The operating pressure at which the air is delivered into the inflation channel 14 opens the check-valves 13 to allow air to pass into the tubular portions 19 to inflate the remaining portions of the cushion 18. Once inflation of the cushion 18 is complete, the pressure of the air within each tubular portion 19 acts against the check valves 13 to keep the valves in the closed position, thus preventing air from escaping and the cushion from deflating.

In some embodiments, the inflatable cushion 18 further includes seal segments 28. The seal segments divide the inflatable chambers 19 in transverse chamber portions 19. The seal segments 28 may be aligned longitudinally and separated by transverse seals 21. The seal segments 28 create bendable lines that allow for a more flexible film 10 that can be easily bent or folded. Such flexibility allows for the film 10 to wrap around regular and irregular shaped objects. The chamber portions 19 are in fluid communication with adjacent chamber portions 19 *a* as well as with the inflation channel 14. As shown in the example, passages 19*b* extend between chamber portions 19 *a* on either side of the seal segments 28.

In accordance with various embodiments, separation regions comprise a series of lines of weaknesses 26 may be disposed along the longitudinal extent of the film 10. The transverse lines of weakness 26 facilitate separation of adjacent inflatable chambers 19.

Dunnage

In accordance with various embodiments, the connective protective packaging can include dunnage made out of paper or other suitable material, which is typically converted into dunnage from a supply a sheet material, whether individual sheets or a continuous sheet. The supply material can be converted by crumpling, folding, flattening, creasing, or other similar methods that converts high-density configuration to a low-density configuration. Most commonly, this type of dunnage is created by running a generally continuous strip of paper into a dunnage conversion machine that converts a compact supply of stock material, such as a roll or stack of paper, into a lower density dunnage material. The continuous strip of crumpled sheet material may be cut into desired lengths to effectively fill void space within a container holding a product. Various structures of the converting station can be used, such as those converting stations disclosed in U.S. Pat. Nos. 8,962,909, 8,388,508, and 8,016,735. A sticking element can be provided on an exposed surface of the dunnage in configurations as described herein, such as with respect to FIGS. 8A-11. The sticking element can be applied to the dunnage material before the material is converted into the low-density configuration, and in some embodiments, after this conversion. In cases in which the sticking element is applied to the material before the converting, a release layer can be disposed over the sticking element to prevent unwanted sticking in cases in which this is necessary (e.g., to protect the machine and to facilitate the converting process).

FIB Cushions

In accordance with various embodiments, the connective protective packaging can include other types of cushioning materials as well. For example, the connective protective packaging may include foam-in-bag (FIB) cushions. In the context of FIB, foam precursors (e.g., polyurethane foam precursor) can be dispensed in a FIB bag interior and the precursors mix together within the bag to form a "hardened" product (e.g., a "hardened" polymeric product) that has a cushioning quality. Examples of foam-in-bag packaging elements are described in U.S. Publication 2013/0047551. The FIB bag can be made of film plies having exposed surfaces, and one or more portions of an exposed surface has a sticking element, for example, similarly to as described below with reference to FIGS. 4-12.

Sticking Element

As discussed above, a sticking element can be disposed on the exposed surface of protective packaging to provide a connective protective packaging. The sticking element can be provided on the film. Referring to FIGS. 4-12, various examples of connective protective packaging having an exposed surface with a sticking element are provided.

The bonding element preferably comprises a sticking element that provides a sufficiently strong connection through stickage to maintain the desired connection in use. For example, the degree of stickiness of the sticking element can provide the stickage with sufficient connective strength to withstand effects on the protective packaging due to impacts on the container and product during shipment.

In cases in which the protective packaging material is inflatable cushions, for instance, the stickage strength of the connection can be sufficient to withstand effects that stretch and bend the plies due to pressurization of the fluid filled chambers that can be caused, for example, by sharp edges of localized forces from the packaged product. In cases in which the connective protective packaging is stuck onto an interior surface of a container, the strength of the stuck connection can be sufficient to withstand impacts and friction by the product as the container is jostled.

In some embodiments, the sticking material has provides a high degree of stickage and holding, to provide an aggressive bond, which in some cases is stronger than the material of the protective packaging on which it is employed, so that the protective packaging would be destroyed before the connection of the sticking element. In other embodiments, the degree of sticking strength is less, providing a weak bond so that the stickage connection is used to facilitate assembly of the packaging around the product, and then to facilitate disassembly and unsticking thereafter, such as by the recipient who unpacks the product.

The sticking element suitably connects and holds the exposed surface of the protective body to an abutting surface by contact with the sticking element. The sticking element preferably sticks by contact and in some cases upon application of pressure. Preferably the sticking element is selected to provide the stickage-based bond without requiring heat or other materials to be applied, although in some embodiments, other steps may be followed to product the stickage.

The sticking element may include an adhesive or cohesive material to provide an adhesive or cohesive surface, respectively. A combination of adhesive and cohesive surfaces can be used. The sticking element can be applied directly to the exposed surface of the material by suitable known methods, or it can be applied on a tape, such as a double sided tape, or other suitable methods As used herein, an adhesive sticking element is made of a material that adheres to other types of surfaces, preferably such as ones that would be typically be found in the vicinity of protective packaging, such as to plastic, paper, or metals. The adhesive can stick to an opposing surface without relying on the opposing surface having the same or a complimentary material for the stickage to take place to form a connection between the two surfaces. Examples of suitable adhesives include liquid adhesives, and pressure sensitive adhesives. Pressure sensitive adhesives can be selected that stich after applying a slight, initial, external pressure to create the bond. Examples of these include water-based, acrylic, pressure sensitive adhesives, similar to what is applied to packaging tape, which material holds two surfaces together solely by surface contact, often upon a slight initial external pressure. These are examples dry adhesives, which typically require no activation with water, solvent or heat, and firmly adhere to many dissimilar surfaces. Pressure sensitive adhesives can be selected that are aggressive and permanently tacky at room temperature. Pressure sensitive adhesive application and use can be automated. When used in assembly, pressure sensitive adhesives that do not require setup or long curing times can be used to save time compared to using typical liquid adhesives. Adhesion is preferably immediate with pressure sensitive adhesives, allowing manufacturing procedures to continue uninterrupted, which can results in significant time and labor savings. Examples of water based, acrylic, pressure sensitive adhesives include those known as RHOPLEX N-1031 Emulsion, RHOPLEX N-580 Emulsion, and RHOPLEX N-619 Emulsion. Other emulsion polymers or acrylic polymer blend adhesives are also known, and other suitable types of adhesives and of contact adhesives can be used.

A cohesive material of the sticking element causes one surface to stick to an opposing surface by coming into contact with the same or a complimentary cohesive substance to form the bond between the two surfaces. Cohesives, in which opposing cohesives stick to one another, do not stick to other substances sufficiently to adhere to those other substances (e.g., other surfaces of the protective packaging material that do not have a cohesive element, surfaces of the container, surfaces of the product to be shipped), or in some cases would stick very weakly compared to the bond they form from sticking to each other. A cohesive can be a pressure sensitive cohesive, in which pressure is required to activate the bond. Examples of a suitable cohesive material from which the cohesive sticking elements can be made include natural and synthetic latex-based cohesives. The cohesive material in some embodiments is applied as a liquid to the appropriate portion of the protective packaging material, and in others is applied in other known forms. Some types of cohesives, such as ones made with latex, is mixed with water without additional adhesives to bond to the respective, non-cohesive, portion of the protective packaging material, and upon drying remains stuck to the exposed surface of the protective packaging material to which is has been applied. In some embodiments, the cohesive material can be mixed with an adhesive, often applied as a liquid, onto the protective packaging material. The adhesive can be selected so that after applying the cohesive and adhesive mixture onto the protective packaging material (e.g., onto a film ply), the adhesive evaporates, leaving the cohesive bonded to the non-cohesive protective packaging material (e.g., onto a film or paper ply). One method of liquid application is spraying, although brushing or other suitable methods can be used. Also, other suitable methods of applying the cohesive to the non-cohesive material surface can alternatively be used.

In accordance with the various embodiments provided herein, when one or more surfaces of a connective protective packaging material has a sticking element applied thereto, the sticking element facilitates configuring and/or using the connective protective packaging material (e.g. the cushion) with items that are to be protected. For example, the sticking element can allow the one or more surfaces to stick to another portion of the surface or to another surface of the connective protecting packaging element to either form a pocket or better contain the item to be protected. By allowing the protective packaging to connect to itself or another surface, the one or more surfaces having a sticking element allow the connective protective packaging to better encase the product forming a pouch, bag, or other similar barriers. Also, chains of cushions can be lengthened by attaching cushions to one another via the sticking elements.

While FIGS. 4-12 show examples of a sticking element on one or more surfaces of web material for forming fluid filled cushions, the disclosure also applies to sticking elements on surfaces of other suitable types of connective protective packaging elements some of which are discussed above.

Figure 4A:
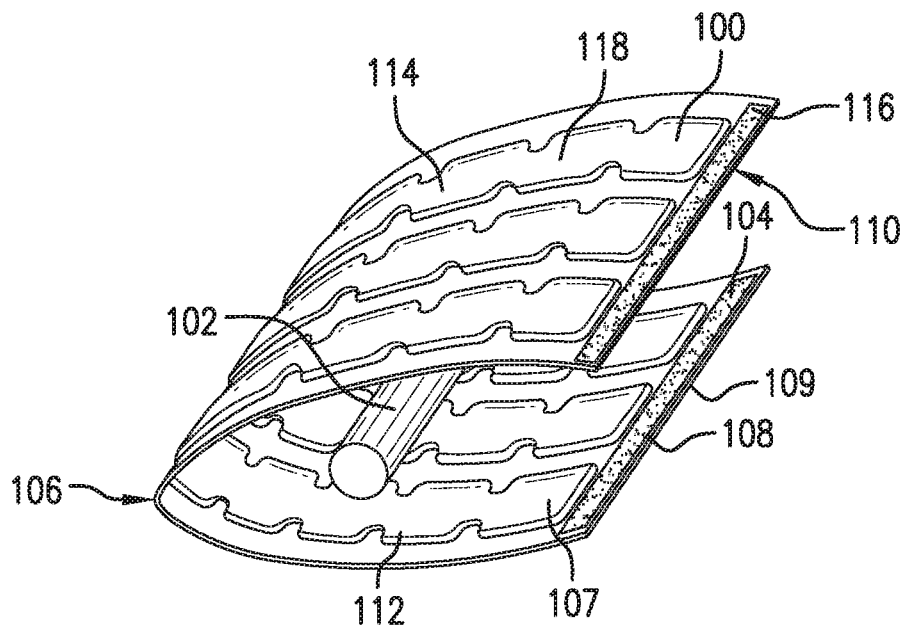
FIGS. 4A-4C show exemplary fluid filled cushion having a sticking element attached to a portion of an exposed surface.
Figure 4B:
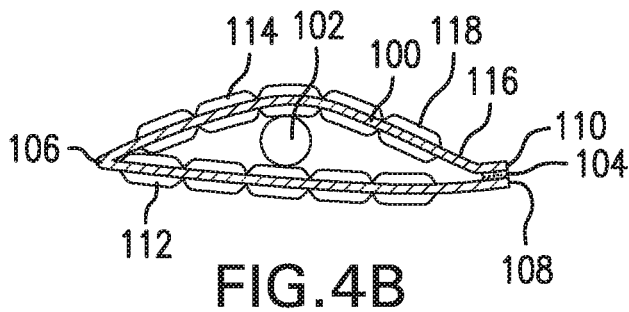
Figure 4C:
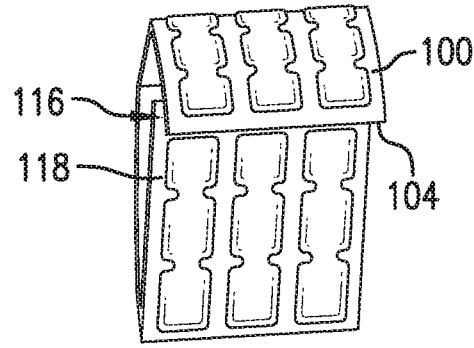

FIGS. 4A-4C show an example of a fluid filled cushion 100 having a sticking element 104 attached to a portion of an exposed surface 107 (first exposed surface portion 108) of the cushion 100. The first exposed surface portion 108 with sticking element 104 can be proximate an edge 109 of the protective packaging element 100. The cushion 100 can be folded over itself at fold 106 to provide a lower wall 112 and an upper wall 114 that encase a product 102 for packaging. As shown in FIG. 4B, when folded, the sticking element 104 on the first exposed surface portion 108 contacts another portion of the same exposed surface 107 (second exposed surface portion 110), which in come embodiments is provided with sticking element 104 in a corresponding position, and in another embodiment is free of the sticking element so that the sticking element 104 on surface portion 108 sticks directly to surface portion 110. As shown in FIG. 4C, the cushion 100 can be folded so that the sticking element 104 on the first exposed surface portion 108 contacts a portion 116 of another exposed surface 118 of the cushion 110 (such as on the opposite side of the web that forms cushion 100 from exposed surface 107). The sticking element 104 provides a sufficient connection to hold the first and second exposed surface portions 108, 110 (or 108, 116) together (e.g., by contact with the sticking element 104), to form a pouch encasing the product 102.

For embodiments in which the sticking element is an adhesive or has an adhesive property, the sticking element 104 can adhere to any suitable portion of the exposed surface 107. Thus, a user can wrap the cushion 100 around the product and adhere the sticking element 104 to another portion of the surface 107 to provide a pouch appropriately configured to encase the product 102. Thus, the cushion 100 can be used to effectively encase and protect various sized products 102. For embodiments in which the sticking element 104 on the first exposed surface portion 108 has a cohesive applied thereto or has a cohesive property, the second exposed surface portion 110 can have a corresponding cohesive sticking element 104 causing the second exposed surface portion 110 to connect to the first exposed surface portion 108 in response to coming into contact with one another. Multiple sticking elements 104 can be placed on the exposed surface 107 to provide multiple sizes of pouches for accommodating various sized products 102.

Figure 5:
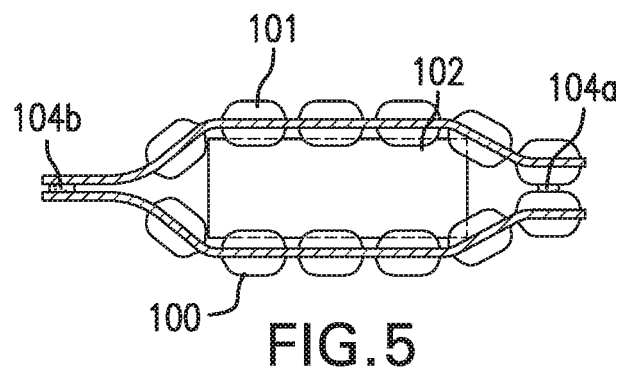
FIG. 5 shows a pouch formed by two cushions and two sticking elements.
Figure 6:
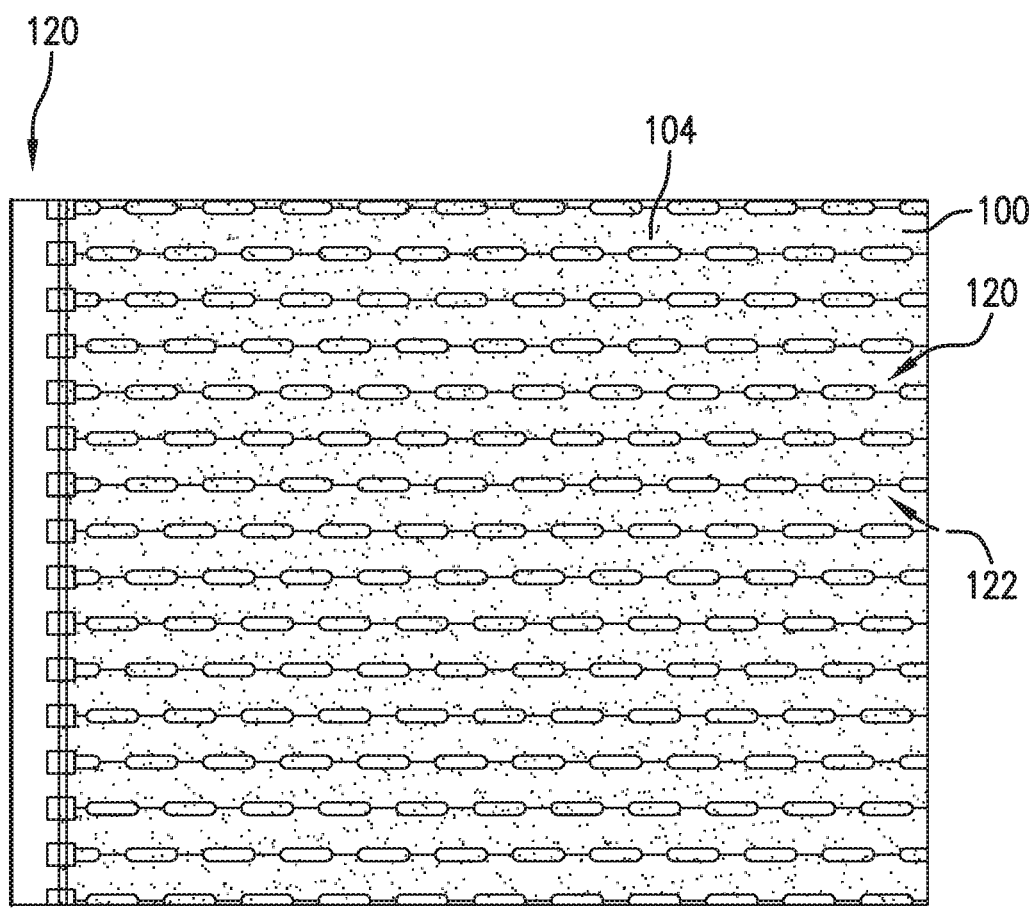
FIG. 6 shows a web material for forming a cushion in which substantially all (e.g., all) of an exposed surfaces of cushion has a sticking element.

FIG. 5, shows a pouch formed by two cushions 100, 101 and two sticking elements 104a, 104b. The sticking elements 104 may be suitably located anywhere on the surface of the film. In on example, as shown in FIG. 5, one of the sticking elements 104a is disposed at location of the cushions 100, 101 that is between adjacent seals forming an air chamber. In this position the sticking element 104a is elevated or moved with respect to the plane of the uninflated film when the cushion 100 is filled with fluid. A sticking element 104b is disposed at a location of the cushion that does not fill with air and as such is not affected in the same way as location 104a when the cushion 100 is filled.

In other embodiments, the sticking element may be distributed in different ways across multiple cushions. For example, in situations in which the sticking element 104a, 104b is an adhesive, one of the cushions 100, 101 has both sticking elements 104a, 104b and the other of the two cushions 100, 101 does not have any sticking elements. In another example, one of the cushions 100, 101 has sticking element 104a and the other of the cushions 100, 101 has sticking element 104b. In another example, both cushions 100, 101 have both sticking elements 104a, 104b.

In other embodiments, both cushions can have corresponding sticking elements. For example, in situations in which the sticking element 104a, 104b is a cohesive, the cushions 100, 101 can each have corresponding sticking elements 104a, 104b that stick to one another when the surfaces abut one another. In some embodiments, the sticking elements 104a, 104b is positioned substantially equidistant from a natural hinge, such as an elongated seal line or a group of aligned seal lines, so that when the protective packaging is folded at the natural hinge, the sticking elements 104a, 104b align. The natural hinge (e.g., seal line) can be straight, bent, or otherwise curved. For example, the natural hinge can be non-linear to accommodate unusually shaped products, so that the sticking elements align when packaging is wrapped around the product.

As shown in FIG. 6, in some embodiments substantially all or all of one or more exposed surfaces 120, 122 of cushion 100 has a sticking element 104 to facilitate the configuration and use of the cushion 100. In some embodiments, when the sticking element 104 covers substantially all of one or more exposed surfaces 120, 122, the sticking element 104 is not disposed adjacent and/or within the inflation region 120, in order to prevent the sticking element 104 from interfering with inflation of the cushion 100 by an inflation machine. The sticking element 104 can be applied in strips or lines that coat substantially all of the exposed surface. The sticking element 104 can be sprayed onto exposed surface to coat substantially all of the exposed surface. For example, the cushion can typically be quickly folded (e.g., rolled) onto itself. In cases in which the sticking element 104 is a cohesive that sticks only to itself, the cushion 100 can be folded without the cohesive sticking inadvertently to the product or other surfaces.

The sticking element's 104 ability to connect surfaces can be controlled, which can be particularly advantageous in cases in which the sticking element 104 is an adhesive. For example, a release layer can be disposed on top of the sticking element 104 and removed when the cushion is used to package a product. Additionally or alternatively, the stickiness of the sticking element 104 can be controlled. For example, the sticking element 104 can possess sticking properties only when it is exposed to certain substances. For example, the sticking element 104 can be water activated, and water can be applied to the sticking element 104 (e.g., by a user or by a machine) to make the sticking element 104 able to stick to other surfaces. The sticking material may be able to stick to some materials and not to others (e.g., unable to stick to Polytetrafluoroethylene (PTFE) (e.g., Teflon®)); one or more portions of exposed surfaces of the connective protective packaging can have such materials so to avoid undesired sticking.

Figure 7:
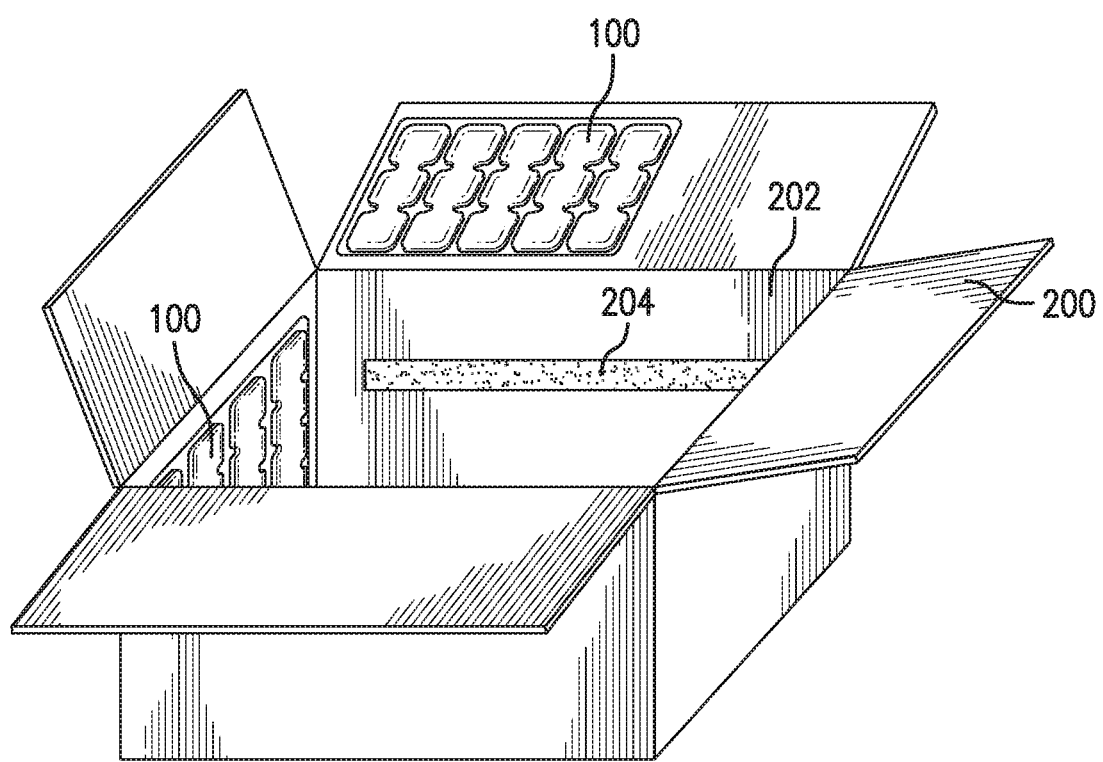
FIG. 7 shows connective protective packaging material connected to a surface of a container.

Referring now to FIG. 7, in some cases, connective protective packaging 100 having a sticking element 104 can stick to a surface of a container 200. The protective packaging unit 100 can have the sticking element 104 on substantially all of a surface (see, e.g., FIG. 6) or on one or more portion of a surface (see, e.g., FIG. 4A). For cases in which the sticking element 104 is an adhesive, the protective packaging unit 100 can be stuck to a surface of any suitable container (e.g., a cardboard carton). For cases in which the sticking element 104 is a cohesive, the protective packaging unit 100 can be stuck to a surface of the container having a corresponding cohesive element. For example, FIG. 7 shows a surface 202 having a strip of a cohesive element 204 that sticks to a surface of a protective packing element having a corresponding cohesive element 204.

While the above description refers to a sticking element having a sticky property, it should be understood that sticking element can have any suitable type of connective property while remaining within the scope of this disclosure. The sticking element forms a connective, adhesive, or cohesive force that is sufficient to prevent or limit separation of the two surfaces during transportation and handling of the product. In some embodiments, the connective, adhesive, or cohesive force exceeds the strength of the martial that the adhesive, or cohesive is applied to. For example, a sticking element is provided that connects the surfaces together with a connection (e.g., a bond) that is stronger than the material to permanently bond the surfaces together. In some cases, a sticking element is provided that connects the surfaces together with a connection (e.g., a bond) that is substantially weaker than the material, for example, to allow the connected surfaces to become separated. For example, when a cushion is folded and surface portions of the cushion are connected via sticking element to encase a product, then a user can pull the surfaces apart to open the pouch and access the product. Also, when a cushion is connected to a surface of a container, a user can pull the cushion off of the surface of the container to more easily dispose of (e.g., recycle) the container and cushion.

FIGS. 8A-8L show schematic representations of web material 601 having various exemplary patterns of one or more sticking elements disposed on a film ply in a repeated pattern. Similar to the various inflatable cushions discussed above, the concepts can be applied to other types of protective packaging material (e.g., FIB bags, dunnage, etc.). The one or more sticking elements disposed on a film ply can include adhesives and/or cohesives.

With reference to FIGS. 8A-8L, in various embodiments, a web material 601 comprises a first film ply 702 having first and second longitudinal edges 706, 710, and a second film ply 704 having first and second longitudinal edges 708, 712. The cushions of FIGS. 8A-8L can have any suitable seal pattern to form one or more inflatable chambers, for example, those explained above with reference to FIGS. 1-3 or other seal patterns as that are known in the art. The second film ply 704 is aligned to be overlapping with the first film ply 702 so that the first respective first longitudinal edges 706, 708 are aligned with each other and the second respective longitudinal edges 710, 712 are aligned with each other. A plurality of seals seal the first and second plies to each other to define a plurality of filling chambers 600(a), 600(b) between the first and second plies that are each inflatable with and configured to contain a fluid (e.g., air). Separation regions 602(a), 602(b) are located between adjacent inflation chambers 600(a), 600(b) to allow separation of the plies and provide a plurality of cushions. The seals are disposed in a repeating seal pattern to form cushions having a similar shape. A plurality of sticking elements 604(a), 604(b), 604(c) disposed on the first film ply 702 in a repeating pattern so that each of the cushions has at least one sticking element. For all of the depicted patterns, the sticking element can be an adhesive or a cohesive.

Figure 8A:
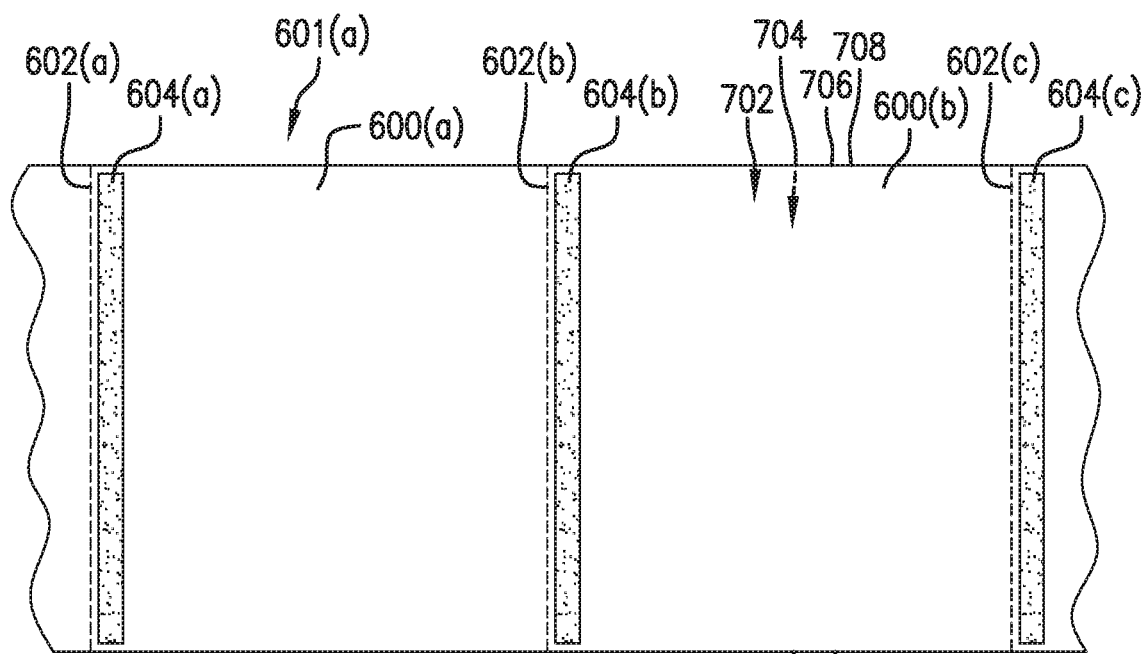
FIGS. 8A-8L show schematic representations of web material having various exemplary patterns of one or more sticking elements disposed on a film ply in a repeated pattern.

FIG. 8A shows an embodiment in which sticking elements 604(a), 604(b) extend proximate an edge of each filling chambers 600(a), 600(b). FIG. 8A shows the sticking elements 604(a), 604(b) extending proximate a transverse edge (e.g., proximate the separation regions 602(a), 602(b) and transverse seal), but the sticking elements 604(a), 604(b) could extend across a longitudinal edge of the filling chambers 600(a), 600(b) (e.g., proximate the longitudinal seal). In cases in which the sticking element has an adhesive property, a user can fold the inflatable cushion onto itself to encase a product (e.g., FIG. 4A). In cases in which the sticking element has a cohesive property, a user can align the sticking element 604 with a corresponding cohesive on another surface to stick hold the surfaces together. In embodiments in which the sticking elements 605, 606 are adhesive or have an adhesive property, a user can fold the cushion onto itself at any point to form the desired structure.

Figure 8B:
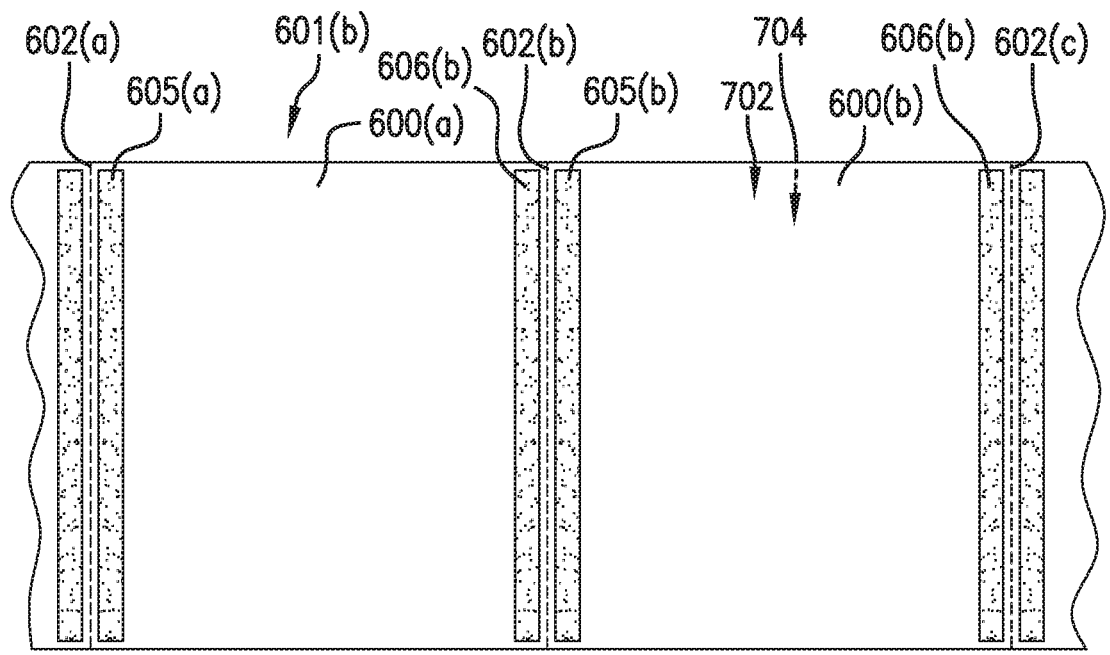

FIG. 8B shows an embodiment in which two sticking elements 605, 606 extend proximate edges of the filling chamber 600(a), 600(b). FIG. 8B shows the sticking elements 605, 606 extending proximate the transverse edges (e.g., proximate the separation regions 602(a), 602(b) and transverse seal), but the sticking element 606, 605 could extend across the longitudinal edges of the filling chambers 600(a), 600(b) (e.g., proximate the longitudinal seals). In embodiments in which the sticking elements 605, 606 have a cohesive property, a user can fold the cushion onto itself so that the sticking elements 605, 606 align and the cushion encases the product.

Figure 8C:
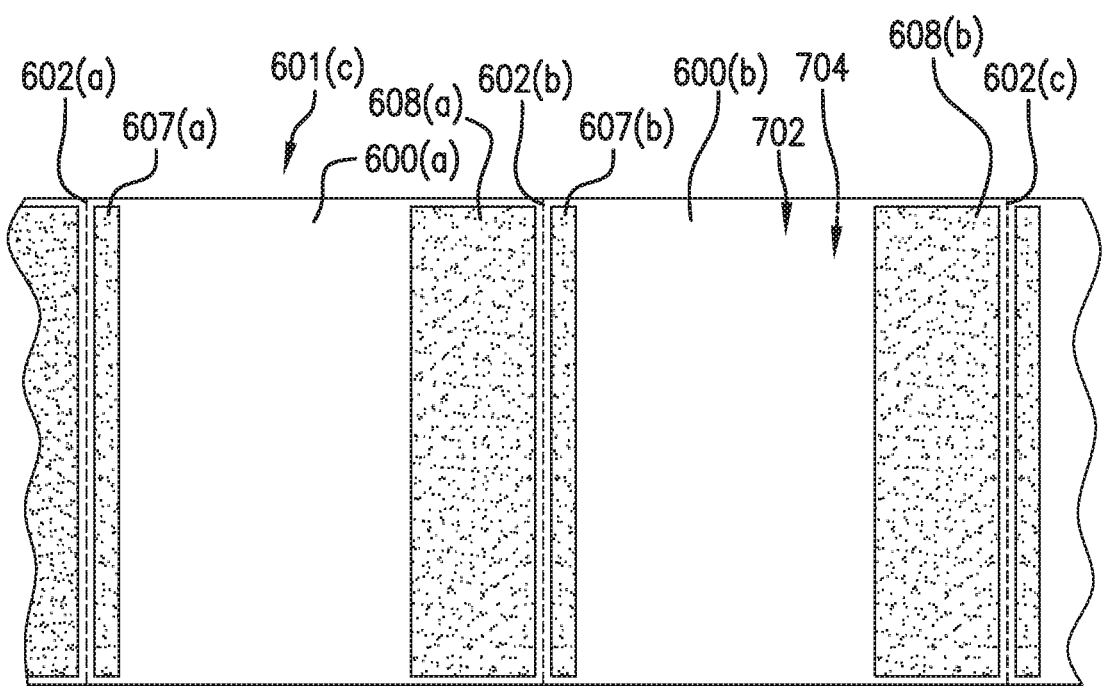

FIG. 8C shows an embodiment in which two sticking elements 607, 608 extend proximate edges of the filling chambers 600(a), 600(b). FIG. 8C shows the sticking elements 607, 608 extending proximate the transverse edges (e.g., proximate the separation regions 602(a), 602(b) and transverse seal), but the sticking element 607, 608 could extend across the longitudinal edges of the filling chambers 600(a), 600(b) (e.g., proximate the longitudinal seals). In embodiments in which the sticking elements 607, 608 have a cohesive property, a user can fold the cushion onto itself so that the sticking elements 607, 608 align and the cushion encases the product. Since one sticking element 608 is wider in the transverse direction than the other sticking element 607, various sized enclosures can be formed when the cushion is folded onto itself.

Figure 8D:
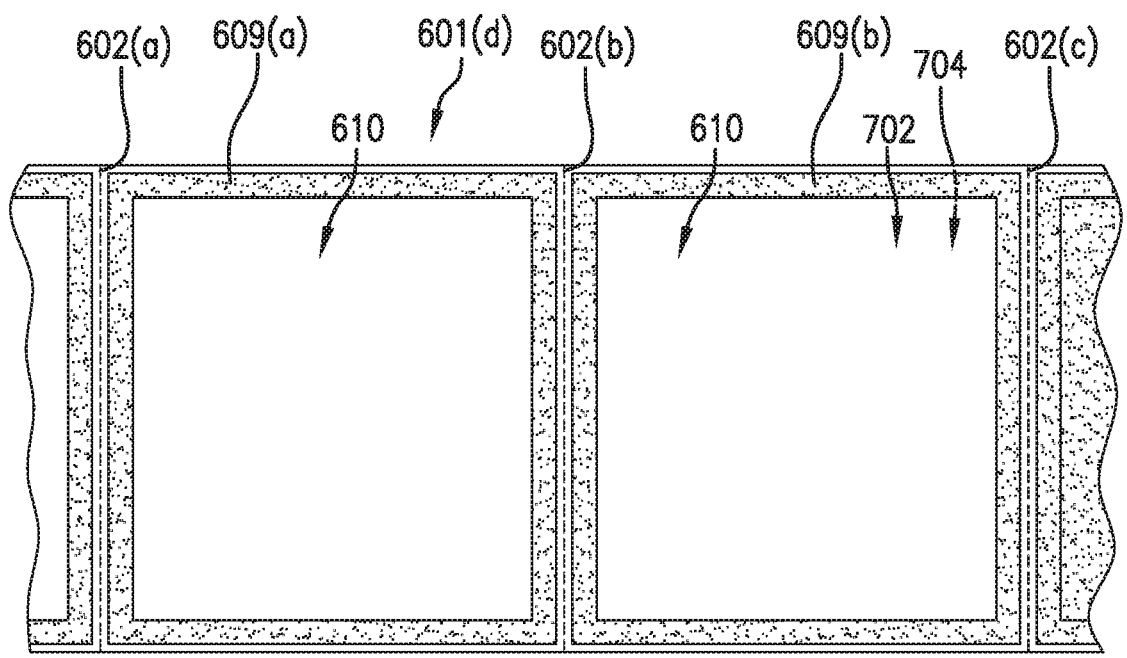

FIG. 8D shows an embodiment in which sealing element 609 extends around the periphery of filling chambers 600(a), 600(b). An area 610 that does not have a sticking element 609 is provided for containing a product. Thus, a user can fold the cushion onto itself to align the sticking elements 609 of an individual cushion, or the user can place one cushion on top of another cushion so that the sticking elements 609 align.

Figure 8E:
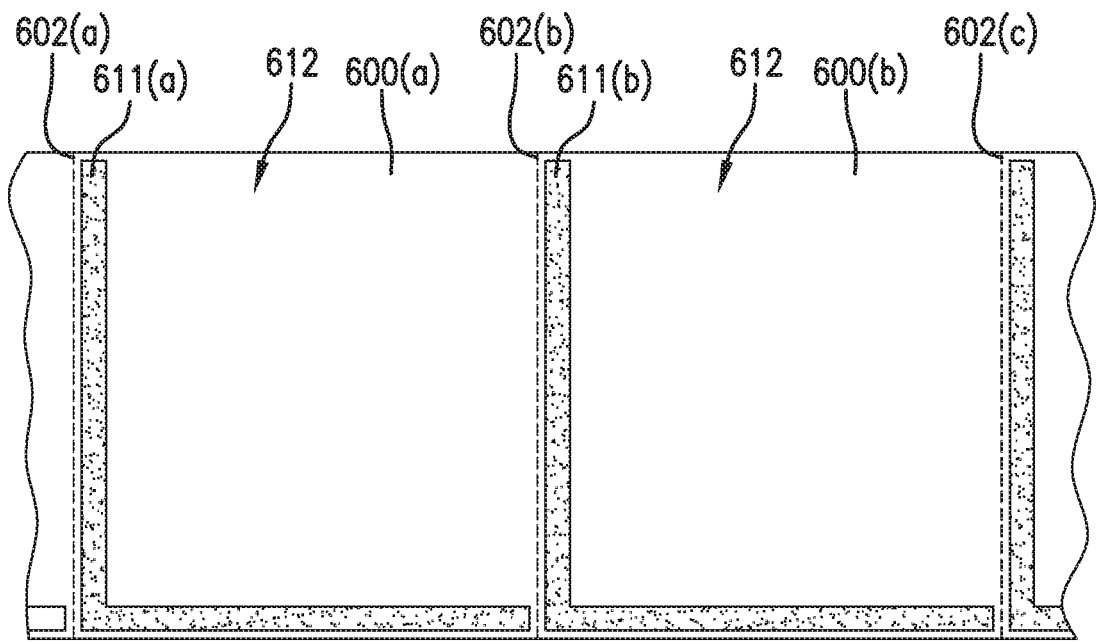

FIG. 8E shows an embodiment in which sticking element 611 extends proximate a transverse edge and proximate a longitudinal edge of the inflation chambers 600(a), 600(b). In cases in which the sticking element 611 is a cohesive, the cushion can be folded onto itself so that the two surfaces having sticking element 611 align, providing a pouch that has an opening. In cases in which the sticking element 611 is has an adhesive property, one cushion can be placed on top of another cushion so that edges having the sticking elements 611 align with edges that do not have a sticking element 611, and the two cushions can together encase a product placed within product containment area 612. Also, a cushion can comprise two inflation chambers 600(a), 600(b), e.g., by separating separation regions 602(a) and 602(c) and not separating 602(b). Thus, cushion 600(b) can be folded onto cushion 600(a) to form product containment areas.

Figure 8F:
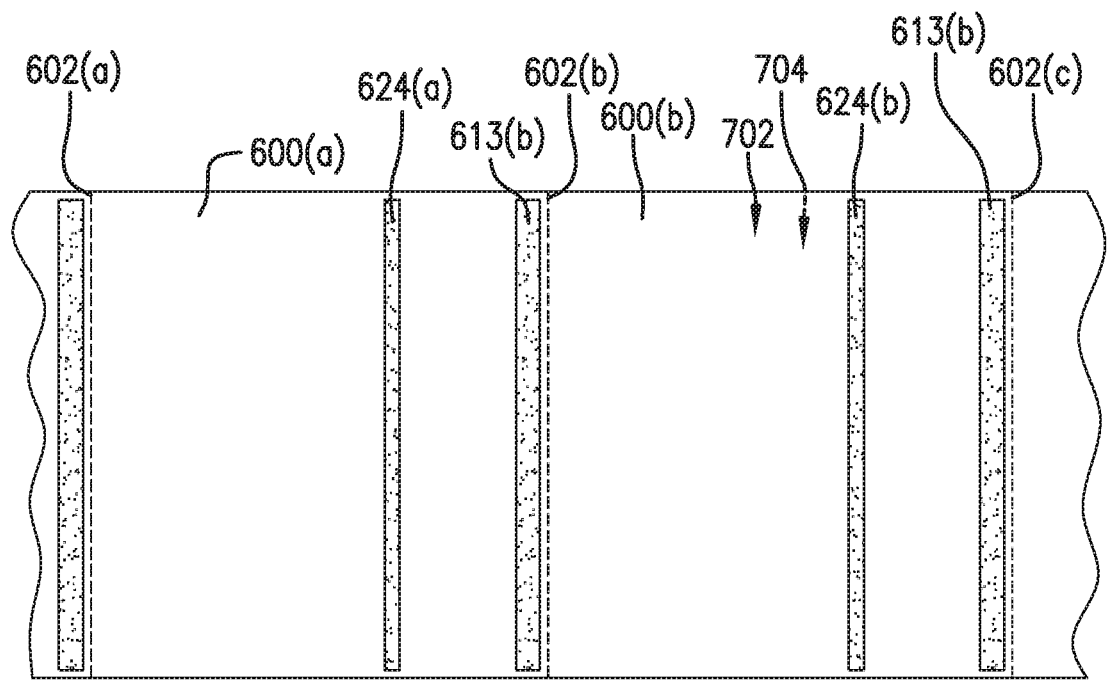

FIG. 8F shows an embodiment in which a sticking element 613 extends proximate an edge (e.g., transverse edge) and another sticking element 612 extends further from the edge. Thus, the cushions can be folded onto themselves to provide differently sized product containment areas for encasing variously shaped products. Also, a cushion can comprise two inflation chambers 600(a), 600(b), e.g., by separating separation regions 602(a) and 602(c) and not separating 602(b). Thus, cushion 600(b) can be folded onto cushion 600(a) to form product containment areas.

Figure 8G:
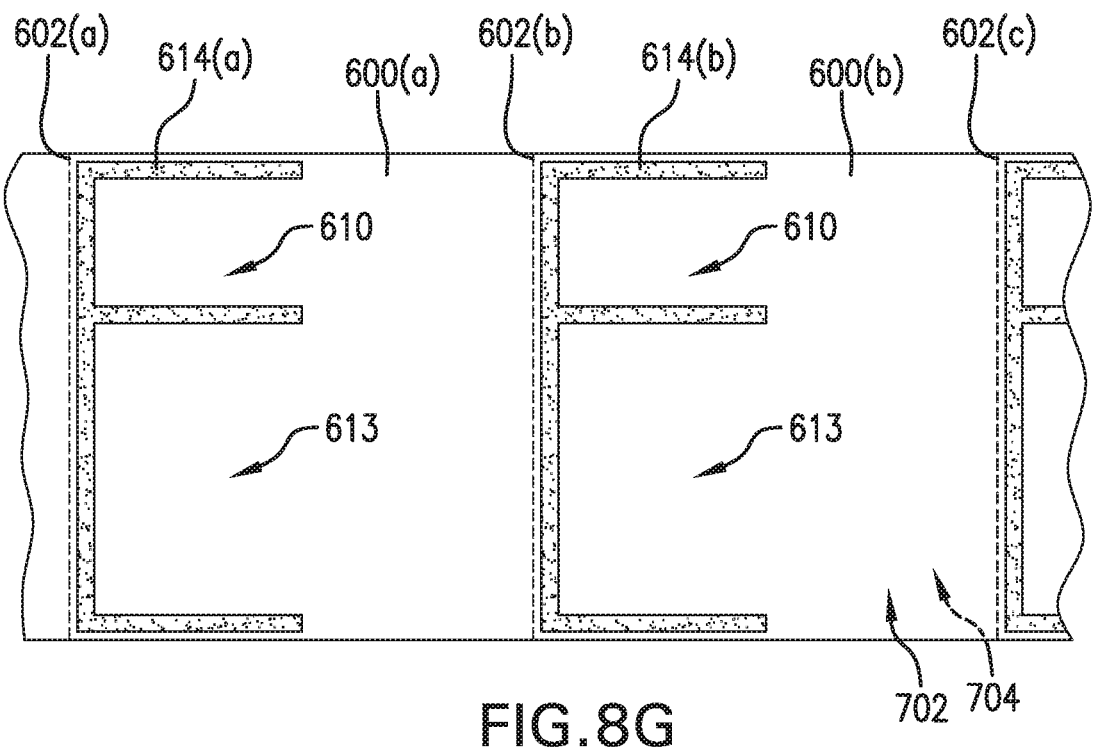

FIG. 8G shows an embodiment in which a sticking element 614 extends proximate a transverse edge and longitudinally of the inflation chambers 600(a), 600(b). When the cushion is folded onto itself over so that the transverse edges are proximate one another, two containment areas 612(a), 612(b) are formed. Also, a cushion can comprise two inflation chambers 600(a), 600(b), e.g., by separating separation regions 602(a) and 602(c) and not separating 602(b). Thus, cushion 600(b) can be folded onto cushion 600(a) to form product containment areas.

Figure 8H:
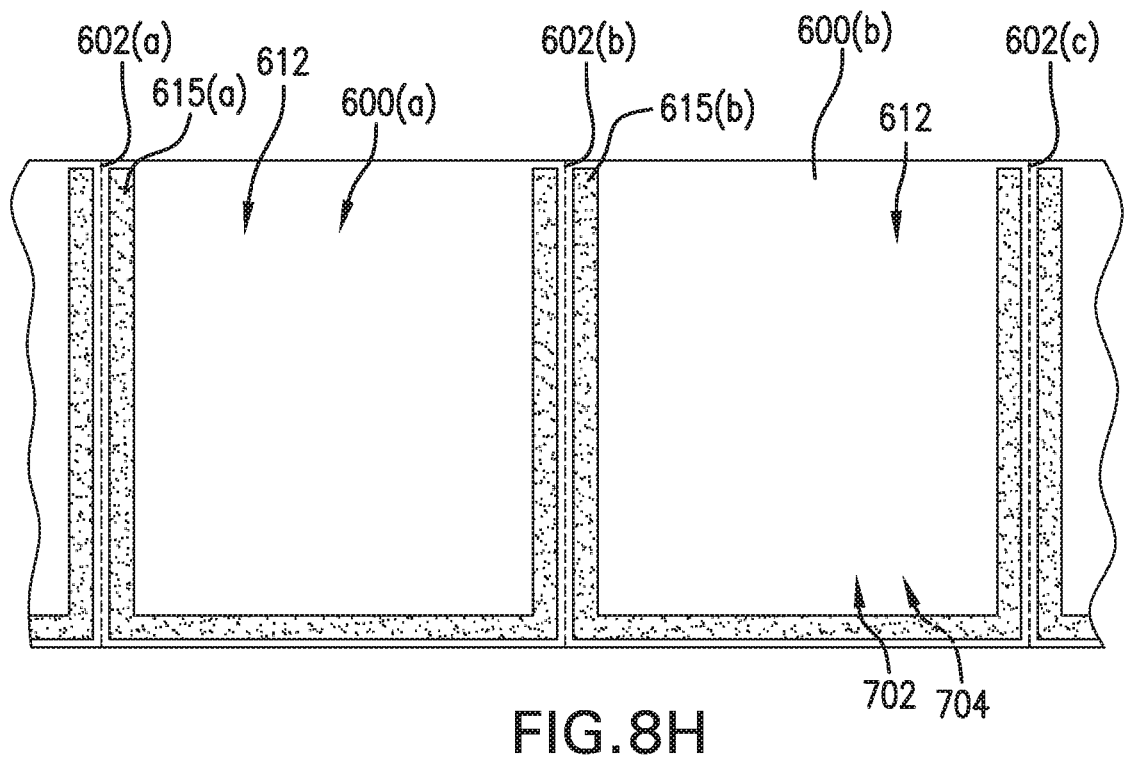

FIG. 8H shows an embodiment having a sticking element 615 proximate three edges of the inflation chambers 600(a), 600(b). In some embodiments, the two sticking elements extending transversely are cohesive, and the sticking element extending longitudinally is adhesive. In some embodiments, the entire sticking element is an adhesive or a cohesive. A cushion can comprise two inflation chambers 600(a), 600(b), e.g., by separating separation regions 602(a) and 602(c) and not separating 602(b). Thus, cushion 600(b) can be folded onto cushion 600(a) to form product containment areas.

Figure 8I:
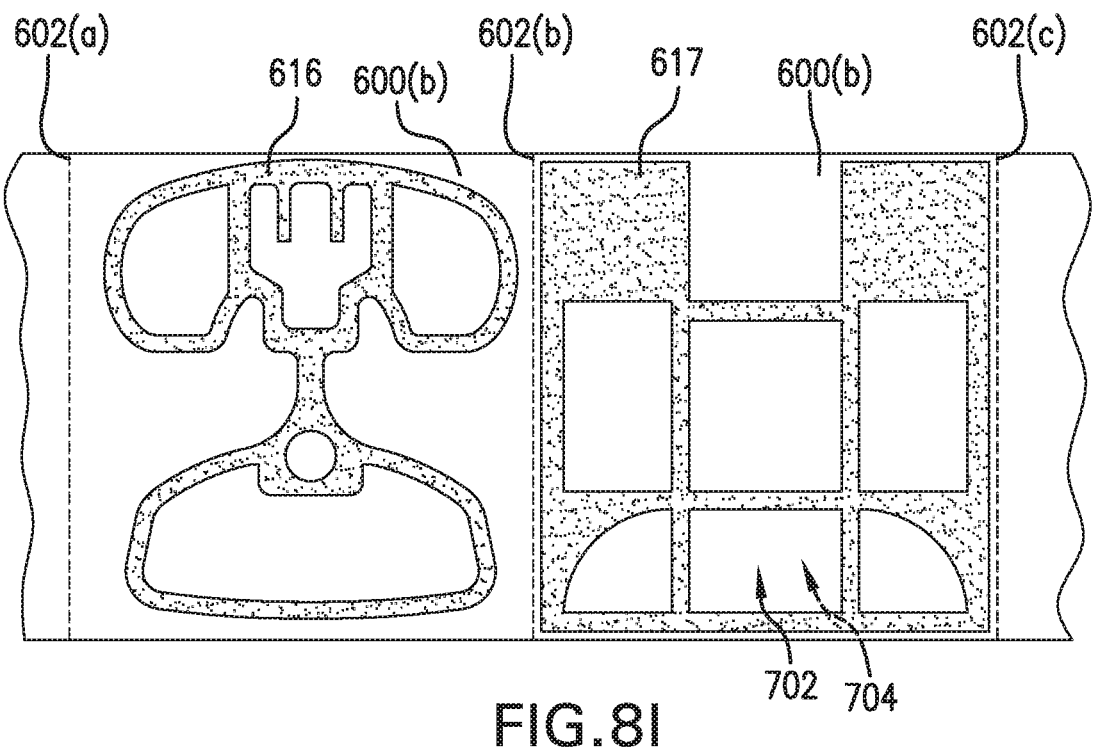
Figure 8J:
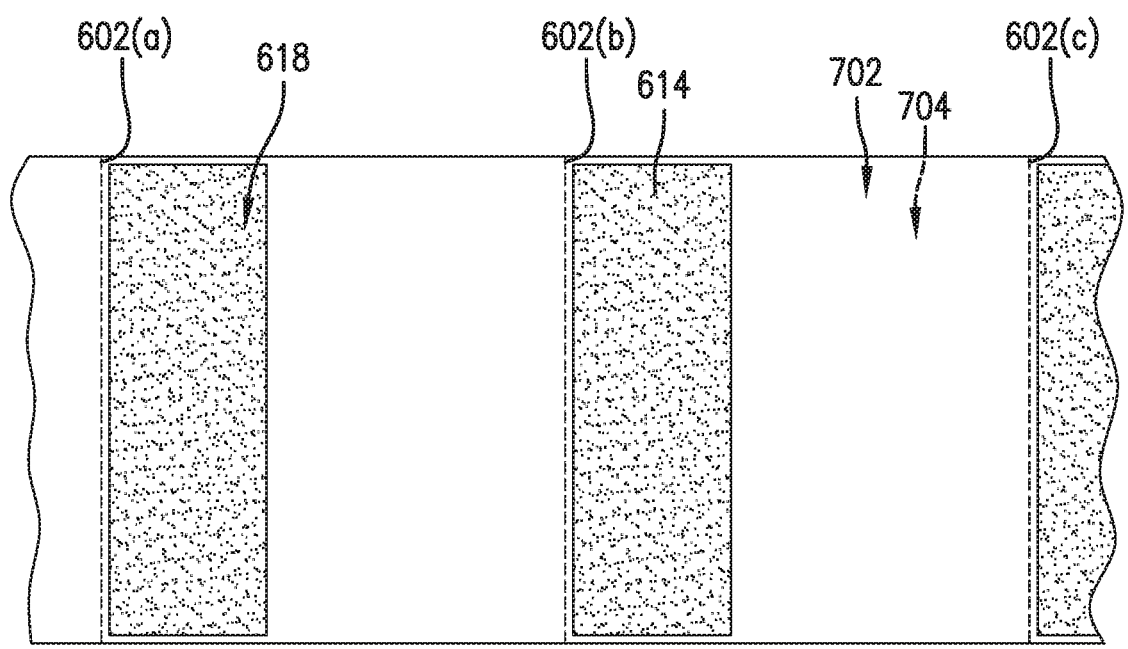

FIG. 8I shows an embodiment having sticking elements 616, 617 in patterns such that the cushions can be folded onto themselves to provide differently sized product containment areas for encasing variously shaped products. For example, the cushion can comprise two inflation chambers 600(a), 600(b) by separating separation regions 602(a) and 602(c) and not separating 602(b). Thus, sticking element 616 can cooperate with sticking element 617 to form product containment areas.

8J, and 8L show embodiments in which sticking element 614; 615; 616, 617; 618, 619 have patterns such that the cushions can be folded onto themselves to provide differently sized product containment areas for encasing variously shaped products. FIG. 8L shows an embodiment in which sticking elements 621, 623 are disposed between interior seals 622 that define inflatable chambers. The sticking elements 621, 623 can be substantially equidistant (e.g., equidistant) from the seals 622 so that the sticking elements 621, 623 are located at a highest location of the inflatable chamber when inflated, thus facilitating the sticking elements 621 to 623 in sticking to another surface.

Figure 8K:
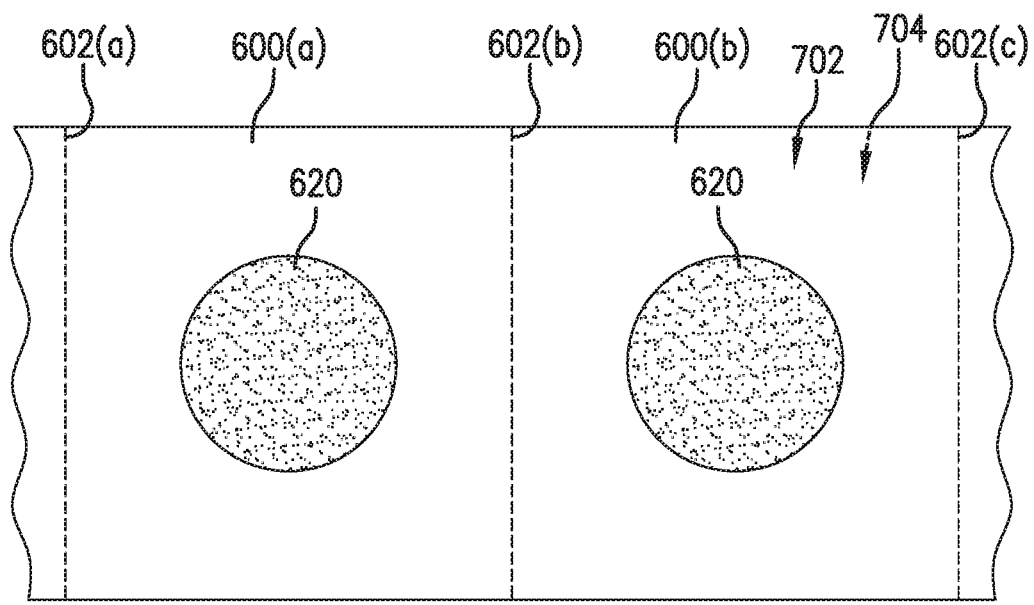
Figure 8L:
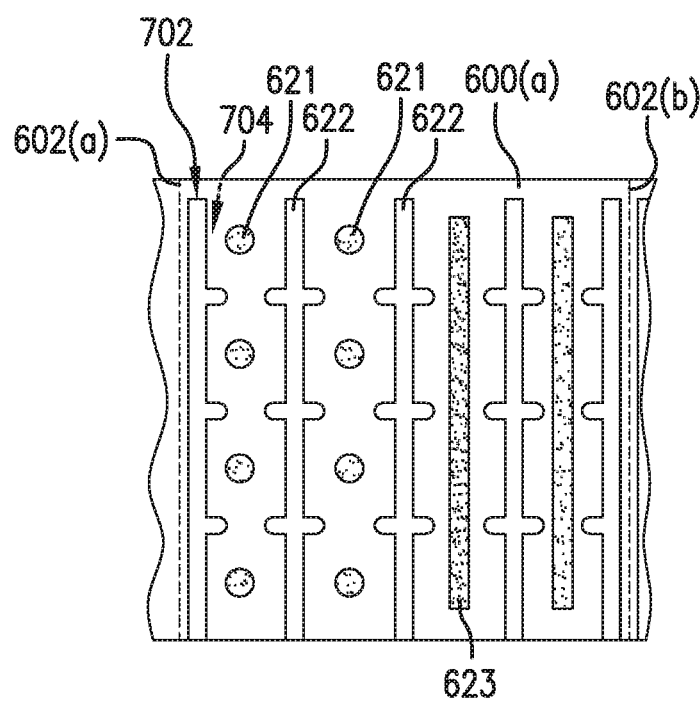

FIG. 8K shows an embodiment in which a sticking element 620 is disposed in an interior portion of the inflation chamber. For example, the sticking element can adhere to a surface of a container.

Figure 12:
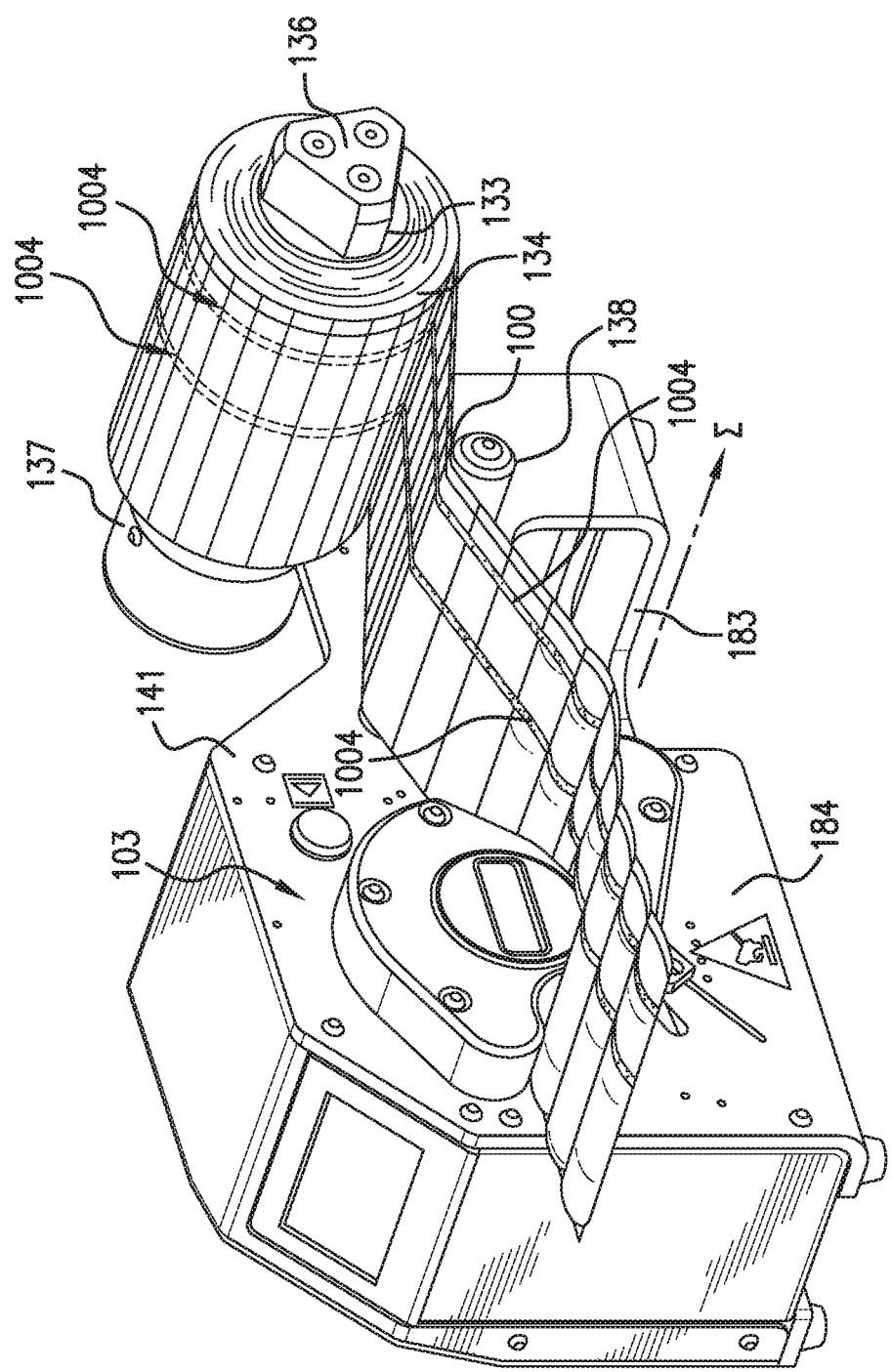
FIG. 12 shows an inflation machine that can be used to inflate inflatable cushions.

FIGS. 9-11 show a supply of film material 1002 for supplying through an inflation machine (e.g., as shown in FIG. 12) to form protective packaging a sticking element 1004 on an exposed surface. In some embodiments, the sticking element is applied to an exposed surface of one or more plies before the plies are converted by sealing two plies. For example, the sticking element can be applied to an exposed surface of overlapping plies before they are sealed. In some embodiments, the sticking element is applied to the supply material after converting the plies with seals but before inflating the inflation chambers. In some embodiments, the sticking element is applied to the protective packaging after the inflation chambers are inflated. In the case of dunnage, the sticking element can be applied to the material before or after the material is converted into dunnage.

FIG. 9 has a release material 1005 on an exterior surface of each wind of the web material 1002 on a roll, and a sticking element 1004 on the interior surfaces of the web winds. The areas of the sticking element 1004 and release material 1005 can be comtinuous or placed to overlap each other to allow the winds of the web 1002 to be unwound from the roll to keep the sticking element 1004 from sticking the winds of web to the winds beneath it in the roll.

FIGS. 10 and 11 show a supply of film material 1002 in which the material 1002 has alternating regions of sticking element 1004 and a release material 1005. As shown in FIG. 10, the supply material 1002 can be folded in a fanfold configuration. FIG. 11 shows a roll 1000 of the web supply material. In these figures, the web material 1002 has a sticking element 1004 and another surface of the web material 1002 has a release material 1005 that prevents the sticking element 1004 from sticking to the other surface. For example, the exterior surface of a first filling chamber 600(a) in the web 1002 can have a sticking element 1004, and the exterior surface of a second, adjacent filling chamber 600(*b*) can have a release material 1005.

In embodiments in which the sticking element 1004 is a cohesive, the release material 1005 can be a portion of the web that is free from cohesive. In embodiments in which the sticking element 1004 is an adhesive, the release material 1005 can have a release layer that the advesive does not stick to. In embodiments in which the sticking element 1004 is an adhesive that adheres to some materials and not to others, then the release area 1005 can have such other material (e.g., Polytetrafluoroethylene (PTFE)).

In accordance with various embodiments and as illustrated in FIG. 12, the connective protective packaging can be fed in bulk to an inflation and sealing machine. The machine processes the material inflating, sealing, and in some instances cutting it. The inflated material can then be folded and connected to itself or another structure as discussed herein.

Those of ordinary skill in the art will understand that the disclosed embodiments can be adapted and modified to provide alternative embodiments for other applications, and those other additions and modifications can be made to the disclosure without departing from the scope of the present disclosure. For example, features of the illustrative embodiments can be combined, separated, interchanged, and/or rearranged to generate other embodiments. Such modifications and variations are intended to be included within the scope of the present disclosure. Similarly, the subject matter discussed herein may also be incorporated into the various system disclosed in the incorporated references. Embodiments are not meant to stand alone, but may be combined with other embodiments from other referenced applications or various other embodiments disclosed herein.

The invention claimed is:

1. A connective protective packaging element, comprising:
   a protective body in a high-density supply configuration, the protective body being configurable into a low-density configuration for cushioning packaged products, the protective body including a surface that is exposed when the protective body is in the low-density configuration; and
   a plurality of cohesive bonding elements made from a cohesive substance attached to the surface that is exposed in the high-density supply configuration in a repeating pattern such that each cohesive boding element is spaced apart from an adjacent cohesive boding element, the plurality of cohesive bonding elements being configured to selectively bonds to a complimentary cohesive substance attached to an abutting surface.

2. The connective protective packaging element of claim 1, wherein:
   the protective body comprises a web having a first ply and a second ply overlapping the first ply, the first ply and the second ply being connected together to define therebetween a fillable chamber to contain a filler element that separates the first ply and the second ply in the low-density configuration; and
   the first ply including the surface that is exposed with the cohesive bonding element.

3. The connective protective packaging element of claim 2, wherein the first ply and the second ply are connected together to trap a fluid therebetween when sealed, such that the connective protective packaging element is an inflatable cushion.

4. The connective protective packing element of claim 3, wherein the fluid is air, and wherein the first ply and the second ply are connected together by an airtight seal.

5. The connective protective packaging element of claim 2, wherein:
   the protective body has an exterior edge; and
   at least one of the plurality of cohesive bonding elements is disposed on the exposed surface to align with and bond to another one of the plurality of cohesive bonding elements when the protective body is folded over itself such that the exterior edge is folded over itself.

6. The connective protective packaging element of claim 1, wherein the connective protective packaging element is a foam-in-bag cushion.

7. The connective protective packaging element of claim 1, wherein the connective protective packaging element is paper dunnage.

8. The connective protective packaging element of claim 1, wherein the abutting surface is a surface of a product.

9. The connective protective packaging element of claim 1, wherein the cohesive bonding element is positioned proximate an edge of the connective protective packaging element.

10. A supply of web material, comprising:
    a first film ply;
    a second film ply overlapping with the first film ply;
    a plurality of seals sealing the first film ply and the second film ply to each other to define one or more inflation chambers between the first film ply and the second film ply that are each inflatable and configured to contain a fluid; and
    a plurality of bonding elements disposed on an exposed surface of the first film ply, the plurality of bonding elements disposed in a repeating pattern such that each bonding element of the plurality of bonding elements is spaced apart from an adjacent bonding element forming a gap between each bonding element, wherein each bonding element is configured to operably stick to, and hold the exposed surface of the first film ply to, an abutting surface by contact therewith.

11. The connective protective packaging element of claim 10, wherein the abutting surface is an interior surface of a container in which the connective protective packaging element is received, wherein each bonding element bonds to the interior surface to retain the connective protective packaging element in a position against the container while a product to be protected is being packaged.

12. The connective protective packaging element of claim 10, wherein each bonding element is positioned on an inflatable portion of the one or more inflation chambers such that each bonding element is elevated when the one or more inflation chambers are filled with fluid compared to when the inflation chambers are not filled with fluid.

13. The supply of web material of claim 10, further comprising a plurality of separation regions disposed along a longitudinal length of the first film ply and the second film ply, wherein the plurality of separation regions form a plurality of cushions and allow separation between adjacent cushions, wherein at least one bonding element of the plurality of bonding elements is spaced apart from an adjacent bonding element by a separation region of the plurality of separation regions positioned therebetween.

14. The supply of web material of claim 13, wherein the plurality of separation regions align with the plurality of seals allowing separation of adjacent inflation chambers.

15. The supply of web material of claim 10, wherein sticking the plurality of bonding elements are adhesive that sticks to other surfaces.

16. The supply of web material of claim 10, wherein sticking the plurality of bonding elements include a cohesive substance.

17. The supply of web material of claim 10, further comprising:
- a first inflation chamber disposed between the first film ply and the second film ply;
- a second inflation chamber disposed between the first film ply and the second film ply, wherein a separation region is located between the first inflation chamber and the second inflation chamber to allow separation of the first inflation chamber and the second inflation chamber;
- a first bonding element disposed on an exposed surface of the first inflation chamber; and
- a second bonding element disposed on an exposed surface of the second inflation chamber, wherein the first inflation chamber and the second inflation chamber are the same shape, and the first bonding element has a size, position and orientation on the first inflation chamber that matches a size, position, and orientation of the second bonding element on the second inflation chamber.

18. The supply of web material of claim 10, wherein the supply of web material is in a fanfold configuration.

19. The supply of web material of claim 10, wherein the first film ply includes first and second longitudinal edges and the second film ply includes first and second longitudinal edges that are aligned to be overlapping with the first and second longitudinal edges of the first film ply.

20. The connective protective packaging element of claim 10, wherein:
- the first film ply and the second film ply are sealed together by a seal pattern that includes a plurality of transverse seals that define between the first ply and the second ply a plurality of inflation chambers that are inflatable with air that separates the first film ply and the second film ply in the low-density configuration,
- the plurality of transverse seals have transverse ends positioned to define an inflation region between the first film ply and the second film ply to receive and deliver the air into the plurality of inflation chambers;
- the transverse ends of the plurality of transverse seals are positioned such that a longitudinal seal applied across the transverse ends of the plurality of transverse seals seals the plurality of inflation chambers to trap the air therein; and
- each bonding element of the plurality of bonding elements is spaced apart from the transverse ends of the plurality of transverse seals.

21. A system for making a protective packaging element, comprising:
- the connective protective packaging element of claim 20, and
- an inflation and sealing machine that includes:
  - a nozzle that is receivable in the inflation region and supplies the air to inflate the inflation chambers, and
  - a sealer configured to apply the longitudinal seal near the transverse ends of the transverse seals.

22. The supply of web material of claim 10, further comprising a plurality of separation regions extending transversely across the first film ply and the second film ply to facilitate preparation of portions of the first film ply and the second film ply, wherein the bonding elements are spaced apart from the separation regions.

23. A chain of inflatable packaging elements in a high-density supply configuration that is configurable into a low-density configuration for protective package cushioning, comprising two or more connected inflatable packaging elements with a separation region extending therebetween to allow separation of the two or more connected inflatable packaging elements, wherein each connected inflatable packaging element of the two or more connected inflatable packaging elements has a bonding element on a surface that is exposed when the chain is in the low density configuration, wherein the bonding element operably bonds the exposed surface to an abutting surface by contact of the abutting surface against the bonding element when the respective inflatable packaging element of the two or more connected inflatable packaging elements is in the low-density configuration, and wherein the bonding element is spaced apart from the separation region.

24. A system comprising:
- a connective protective packaging element, including:
  - a protective body in a high-density supply configuration, the protective body being configurable into a low-density configuration for cushioning packaged products, the protective body including a surface that is exposed when the protective body is in the low-density configuration; and
  - a cohesive bonding element made from a cohesive substance attached to the surface in the high-density configuration; and
- a container including an interior surface and configured to receive the connective protective packaging element adjacent the interior surface, the container including a complimentary cohesive complimentary cohesive substance on the interior surface;
- wherein the cohesive bonding element selectively bonds to the complimentary cohesive substance with sufficiently strength to retain the connective protective packaging element in a position against the interior surface while a product to be protected is being packaged.

25. A connective protective packaging element, comprising:
- a protective body in a high-density supply configuration, the protective body being configurable into a low-density configuration for cushioning packaged products, the protective body including a surface that is exposed when the protective body is in the low-density configuration;
- wherein:
  - the protective body comprises a web having a first ply and a second ply overlapping the first ply, the first ply including the exposed surface with the cohesive bonding element, the first ply and the second ply being sealed together by a seal pattern that includes a plurality of transverse seals that define between the first ply and the second ply a plurality of inflation chambers that are inflatable with air that separates the first ply and the second ply in the low-density configuration,
  - the plurality of transverse seals have transverse ends positioned to define an inflation region between the first ply and the second ply to receive and deliver the air into the plurality of inflation chambers;
  - the transverse ends of the plurality of transverse seals are positioned such that a longitudinal seal applied across the transverse ends of the plurality of transverse seals seals the plurality of inflation chambers to trap the air therein; and a cohesive bonding element made from a cohesive substance attached to the surface in the high-density supply configuration, which cohesive bonding element selectively bonds to a complimentary cohesive substance attached to an abutting surface, wherein the cohesive bonding element is spaced apart from the transverse ends of the plurality of transverse seals.

26. A system for making a protective packaging element, comprising:
   the connective protective packaging element of claim 25, and
   an inflation and sealing machine that includes:
      a nozzle that is receivable in the inflation region and supplies the air to inflate the inflatable chambers, and
      a sealer configured to apply the longitudinal seal near the transverse ends of the transverse seals.

* * * * *

UNITED STATES PATENT AND TRADEMARK OFFICE
CERTIFICATE OF CORRECTION

PATENT NO. : 11,077,637 B2
APPLICATION NO. : 15/721215
DATED : August 3, 2021
INVENTOR(S) : Thomas D. Wetsch It is certified that error appears in the above-identified patent and that said Letters Patent is hereby corrected as shown below:

In the Claims

At Column 15, Line number 48, Claim 1, delete "boding" and insert --bonding--.

At Column 15, Line number 49, Claim 1, delete "boding" and insert --bonding--.

At Column 15, Line number 51, Claim 1, delete "bonds" and insert --bond--.

At Column 16, Line number 1, Claim 4, delete "packing" and insert --packaging--.

At Column 16, Line number 43, Claim 11, delete "connective protective packaging element" and insert --supply of web material--.

At Column 16, Line numbers 45-46, Claim 11, delete "connective protective packaging element" and insert --web material--.

At Column 16, Line numbers 47-48, Claim 11, delete "connective protective packaging element" and insert --web material--.

At Column 16, Line number 50, Claim 12, delete "connective protective packaging element" and insert --supply of web material--.

At Column 17, Line number 2, Claim 15, delete the word "sticking".

At Column 17, Line number 5, Claim 16, delete the word "sticking".

At Column 17, Line number 33, Claim 20, delete "connective protective packaging element" and insert --supply of web material--.

At Column 17, Line number 55, Claim 21, delete "connective protective packaging element" and Signed and Sealed this
Eighteenth Day of October, 2022

*Katherine Kelly Vidal*

Katherine Kelly Vidal
*Director of the United States Patent and Trademark Office*

CERTIFICATE OF CORRECTION (continued)
U.S. Pat. No. 11,077,637 B2 insert --supply of web material--.

At Column 17, Line number 65, Claim 22, delete "preparation" and insert --separation--.

At Column 18, Line number 32, Claim 24, delete "complimentary cohesive".

At Column 18, Line numbers 35-36, Claim 24, delete "sufficiently" and insert --sufficient--.